US012228177B2

(12) United States Patent
Prevost

(10) Patent No.: US 12,228,177 B2
(45) Date of Patent: Feb. 18, 2025

(54) DRIVELINE WITH DOUBLE CONICAL BEARING JOINTS HAVING POLYCRYSTALLINE DIAMOND POWER TRANSMISSION SURFACES

(71) Applicant: Pi Tech Innovations LLC, Houston, TX (US)

(72) Inventor: Gregory Prevost, Spring, TX (US)

(73) Assignee: Pi Tech Innovations LLC, Houston, TX (US)

( * ) Notice: Subject to any disclaimer, the term of this patent is extended or adjusted under 35 U.S.C. 154(b) by 606 days.

(21) Appl. No.: 17/399,640

(22) Filed: Aug. 11, 2021

(65) Prior Publication Data

US 2022/0136585 A1 May 5, 2022

Related U.S. Application Data

(63) Continuation-in-part of application No. 17/331,399, filed on May 26, 2021, now Pat. No. 11,274,731, which is a continuation of application No. 16/888,079, filed on May 29, 2020, now Pat. No. 11,054,000.

(Continued)

(51) Int. Cl.
*F16D 3/16* (2006.01)
*E21B 17/02* (2006.01)

(52) U.S. Cl.
CPC ............... *F16D 3/16* (2013.01); *E21B 17/02* (2013.01)

(58) Field of Classification Search
CPC .......... E21B 17/02; E21B 17/03; E21B 17/04; E21B 17/05; F16C 1/04; F16C 1/06; F16D 3/16; F16D 3/26; F16D 3/44; Y10T 403/32008; Y10T 403/32016; Y10T 403/32041; Y10T 403/32049; Y10T 403/32081
USPC ..... 464/18, 19, 52, 112, 113, 114, 119, 147; 403/53, 54, 57, 58, 62
See application file for complete search history.

(56) References Cited

U.S. PATENT DOCUMENTS 729,694 A * 6/1903 Stewart ..................... F16C 1/04
464/117
2,499,030 A * 2/1950 Moon ........................ F16D 3/38
464/119

(Continued)

FOREIGN PATENT DOCUMENTS

CA 1286655 C 7/1991
CN 101273151 B 12/2011

(Continued)

OTHER PUBLICATIONS

International Search Report and Written Opinion received in PCT Application No. PCT/US2022/012127 mailed Apr. 4, 2022 [12 pages].

(Continued)

*Primary Examiner* — Josh Skroupa
(74) *Attorney, Agent, or Firm* — Michael S. McCoy; Amatong McCoy LLC

(57) ABSTRACT

Drivelines have double conical bearing joints incorporated therein. The double conical bearing joints provide the drivelines with multiple degrees of freedom and allow the driveline to bear load in any direction. The conical bearing joints of the driveline include polycrystalline diamond bearing surfaces.

23 Claims, 17 Drawing Sheets

Related U.S. Application Data

(60) Provisional application No. 63/064,272, filed on Aug. 11, 2020.

(56) References Cited

U.S. PATENT DOCUMENTS

| | | |
|---|---|---|
| 2,693,396 A | 11/1954 | Gondek |
| 2,947,609 A | 8/1960 | Strong |
| 2,947,610 A | 8/1960 | Hall et al. |
| 3,132,904 A | 5/1964 | Kohei et al. |
| 3,603,652 A | 9/1971 | Youden |
| 3,650,714 A | 3/1972 | Farkas |
| 3,745,623 A | 7/1973 | Wentorf et al. |
| 3,752,541 A | 8/1973 | Mcvey |
| 3,866,987 A | 2/1975 | Garner |
| 3,920,290 A | 11/1975 | Evarts |
| 4,085,634 A | 4/1978 | Sattler |
| 4,225,322 A | 9/1980 | Knemeyer |
| 4,275,935 A | 6/1981 | Thompson et al. |
| 4,285,550 A | 8/1981 | Blackburn et al. |
| 4,382,637 A | 5/1983 | Blackburn et al. |
| 4,410,054 A | 10/1983 | Nagel et al. |
| 4,410,284 A | 10/1983 | Herrick |
| 4,468,138 A | 8/1984 | Nagel |
| 4,525,178 A | 6/1985 | Hall |
| 4,554,208 A | 11/1985 | MacIver et al. |
| 4,560,014 A | 12/1985 | Geczy |
| 4,620,601 A | 11/1986 | Nagel |
| RE32,380 E | 3/1987 | Wentorf, Jr. et al. |
| 4,662,348 A | 5/1987 | Hall et al. |
| 4,679,639 A | 7/1987 | Barr et al. |
| 4,689,847 A | 9/1987 | Huber |
| 4,720,199 A | 1/1988 | Geczy et al. |
| 4,729,440 A | 3/1988 | Hall |
| 4,738,322 A | 4/1988 | Hall et al. |
| 4,764,036 A | 8/1988 | McPherson |
| 4,797,011 A | 1/1989 | Saeki et al. |
| 4,906,528 A | 3/1990 | Cerceau et al. |
| 5,011,514 A | 4/1991 | Cho et al. |
| 5,011,515 A | 4/1991 | Frushour |
| 5,030,276 A | 7/1991 | Sung et al. |
| 5,037,212 A | 8/1991 | Justman et al. |
| 5,066,145 A | 11/1991 | Sibley et al. |
| 5,067,826 A | 11/1991 | Lemelson |
| 5,092,687 A | 3/1992 | Hall |
| 5,112,146 A | 5/1992 | Stangeland |
| 5,151,107 A | 9/1992 | Cho et al. |
| 5,205,188 A | 4/1993 | Repenning et al. |
| 5,253,939 A | 10/1993 | Hall |
| 5,271,749 A | 12/1993 | Rai et al. |
| 5,351,770 A | 10/1994 | Cawthorne et al. |
| 5,364,192 A | 11/1994 | Damm et al. |
| 5,385,715 A | 1/1995 | Fish |
| 5,447,208 A | 9/1995 | Lund et al. |
| 5,462,362 A | 10/1995 | Yuhta et al. |
| 5,514,183 A | 5/1996 | Epstein et al. |
| 5,540,314 A | 7/1996 | Coelln |
| 5,560,716 A | 10/1996 | Tank et al. |
| 5,645,617 A | 7/1997 | Frushour |
| 5,653,146 A * | 8/1997 | Barton .................. F16D 3/16 403/54 |
| 5,653,300 A | 8/1997 | Lund et al. |
| 5,855,996 A | 1/1999 | Corrigan et al. |
| 5,948,541 A | 9/1999 | Inspektor |
| 6,045,029 A | 4/2000 | Scott |
| 6,164,109 A | 12/2000 | Bartosch |
| 6,190,050 B1 | 2/2001 | Campbell |
| 6,209,185 B1 | 4/2001 | Scott |
| 6,409,388 B1 | 6/2002 | Lin |
| 6,488,103 B1 | 12/2002 | Dennis et al. |
| 6,488,715 B1 | 12/2002 | Pope et al. |
| 6,517,583 B1 | 2/2003 | Pope et al. |
| 6,652,201 B2 | 11/2003 | Kunimori et al. |
| 6,655,845 B1 | 12/2003 | Pope et al. |
| 6,737,377 B1 | 5/2004 | Sumiya et al. |
| 6,764,219 B2 | 7/2004 | Doll et al. |
| 6,814,775 B2 | 11/2004 | Scurlock et al. |
| 6,951,578 B1 | 10/2005 | Belnap et al. |
| 7,128,173 B2 | 10/2006 | Lin |
| 7,198,043 B1 | 4/2007 | Zhang |
| 7,234,541 B2 | 6/2007 | Scott et al. |
| 7,311,159 B2 | 12/2007 | Lin et al. |
| 7,441,610 B2 | 10/2008 | Belnap et al. |
| 7,475,744 B2 | 1/2009 | Pope |
| 7,552,782 B1 | 6/2009 | Sexton et al. |
| 7,703,982 B2 | 4/2010 | Cooley |
| 7,737,377 B1 | 6/2010 | Dodal et al. |
| 7,845,436 B2 | 12/2010 | Cooley et al. |
| 7,861,805 B2 | 1/2011 | Dick et al. |
| 7,870,913 B1 | 1/2011 | Sexton et al. |
| 8,069,933 B2 | 12/2011 | Sexton et al. |
| 8,080,071 B1 | 12/2011 | Vail |
| 8,109,247 B2 | 2/2012 | Wakade et al. |
| 8,119,240 B2 | 2/2012 | Cooper |
| 8,163,232 B2 | 4/2012 | Fang et al. |
| 8,277,124 B2 | 10/2012 | Sexton et al. |
| 8,277,722 B2 | 10/2012 | DiGiovanni |
| 8,365,846 B2 | 2/2013 | Dourfaye et al. |
| 8,435,317 B2 | 5/2013 | Burgess et al. |
| 8,480,304 B1 | 7/2013 | Cooley et al. |
| 8,485,284 B2 | 7/2013 | Sithebe |
| 8,582,161 B2 | 11/2013 | Okada |
| 8,613,554 B2 | 12/2013 | Tessier et al. |
| 8,627,904 B2 | 1/2014 | Voronin |
| 8,678,657 B1 | 3/2014 | Knuteson et al. |
| 8,701,797 B2 | 4/2014 | Baudoin |
| 8,702,824 B1 | 4/2014 | Sani et al. |
| 8,734,550 B1 | 5/2014 | Sani |
| 8,757,299 B2 | 6/2014 | DiGiovanni et al. |
| 8,763,727 B1 | 7/2014 | Cooley et al. |
| 8,764,295 B2 | 7/2014 | Dadson et al. |
| 8,789,281 B1 | 7/2014 | Sexton et al. |
| 8,833,635 B1 | 9/2014 | Peterson |
| 8,881,849 B2 | 11/2014 | Shen et al. |
| 8,911,521 B1 | 12/2014 | Miess et al. |
| 8,939,652 B2 | 1/2015 | Peterson et al. |
| 8,974,559 B2 | 3/2015 | Frushour |
| 9,004,198 B2 | 4/2015 | Kulkarni |
| 9,022,149 B2 | 5/2015 | Lyons |
| 9,045,941 B2 | 6/2015 | Chustz |
| 9,103,172 B1 | 8/2015 | Bertagnolli et al. |
| 9,127,713 B1 | 9/2015 | Lu |
| 9,145,743 B2 | 9/2015 | Shen et al. |
| 9,151,326 B1 | 10/2015 | Peterson et al. |
| 9,273,381 B2 | 3/2016 | Qian et al. |
| 9,284,980 B1 | 3/2016 | Miess |
| 9,309,923 B1 | 4/2016 | Lingwall et al. |
| 9,353,788 B1 | 5/2016 | Tulett et al. |
| 9,366,085 B2 | 6/2016 | Panahi |
| 9,404,310 B1 | 8/2016 | Sani et al. |
| 9,410,573 B1 | 8/2016 | Lu |
| 9,429,188 B2 | 8/2016 | Peterson et al. |
| 9,488,221 B2 | 11/2016 | Gonzalez |
| 9,562,562 B2 | 2/2017 | Peterson |
| 9,611,885 B1 | 4/2017 | Cooley et al. |
| 9,643,293 B1 | 5/2017 | Miess et al. |
| 9,702,198 B1 | 7/2017 | Topham |
| 9,702,401 B2 | 7/2017 | Gonzalez |
| 9,732,791 B1 | 8/2017 | Gonzalez |
| 9,776,917 B2 | 10/2017 | Tessitore et al. |
| 9,790,749 B2 | 10/2017 | Chen |
| 9,822,523 B1 | 11/2017 | Miess |
| 10,018,146 B2 | 7/2018 | Azevedo et al. |
| 10,060,192 B1 | 8/2018 | Miess et al. |
| 10,113,362 B2 | 10/2018 | Ritchie et al. |
| 10,279,454 B2 | 5/2019 | DiGiovanni et al. |
| 10,294,986 B2 | 5/2019 | Gonzalez |
| 10,307,891 B2 | 6/2019 | Daniels et al. |
| 10,408,086 B1 | 9/2019 | Meier |
| 10,465,775 B1 | 11/2019 | Miess et al. |
| 10,683,895 B2 | 6/2020 | Hall et al. |
| 10,711,792 B2 | 7/2020 | Vidalenc et al. |
| 10,711,833 B2 | 7/2020 | Manwill et al. |
| 10,738,821 B2 | 8/2020 | Miess et al. |

(56) References Cited

U.S. PATENT DOCUMENTS

| | | |
|---|---|---|
| 10,807,913 B1 | 10/2020 | Hawks et al. |
| 10,968,700 B1 | 4/2021 | Raymond |
| 10,968,703 B2 | 4/2021 | Haugvaldstad et al. |
| 11,054,000 B2 | 7/2021 | Prevost et al. |
| 11,085,488 B2 | 8/2021 | Gonzalez |
| 11,118,408 B2 | 9/2021 | Marshall et al. |
| 11,187,040 B2 | 11/2021 | Prevost et al. |
| 11,242,891 B2 | 2/2022 | Miess et al. |
| 11,608,858 B2 | 3/2023 | Prevost et al. |
| 11,655,850 B2 | 5/2023 | Prevost et al. |
| 11,761,481 B2 | 9/2023 | Miess et al. |
| 11,802,443 B2 | 10/2023 | Peters |
| 11,933,356 B1 | 3/2024 | Prevost et al. |
| 11,994,006 B2 | 5/2024 | Prevost et al. |
| 12,006,973 B2 | 6/2024 | Prevost et al. |
| 12,031,574 B2 | 7/2024 | Varghese et al. |
| 2002/0183122 A1* | 12/2002 | Sone ................ F16D 3/16 464/112 |
| 2003/0019106 A1 | 1/2003 | Pope et al. |
| 2003/0075363 A1 | 4/2003 | Lin et al. |
| 2003/0220691 A1 | 11/2003 | Songer et al. |
| 2004/0031625 A1 | 2/2004 | Lin et al. |
| 2004/0134687 A1 | 7/2004 | Radford et al. |
| 2004/0219362 A1 | 11/2004 | Wort et al. |
| 2004/0223676 A1 | 11/2004 | Pope et al. |
| 2006/0060392 A1 | 3/2006 | Eyre |
| 2006/0165973 A1 | 7/2006 | Dumm et al. |
| 2007/0046119 A1 | 3/2007 | Cooley |
| 2008/0085407 A1 | 4/2008 | Cooley et al. |
| 2008/0253706 A1 | 10/2008 | Bischof et al. |
| 2009/0060408 A1 | 3/2009 | Nagasaka et al. |
| 2009/0087563 A1 | 4/2009 | Voegele et al. |
| 2009/0268995 A1 | 10/2009 | Ide et al. |
| 2010/0061676 A1 | 3/2010 | Sugiyama et al. |
| 2010/0276200 A1 | 11/2010 | Schwefe et al. |
| 2010/0307069 A1 | 12/2010 | Bertagnolli et al. |
| 2011/0174547 A1 | 7/2011 | Sexton et al. |
| 2011/0203791 A1 | 8/2011 | Jin et al. |
| 2011/0220415 A1 | 9/2011 | Jin et al. |
| 2011/0297454 A1 | 12/2011 | Shen et al. |
| 2012/0037425 A1 | 2/2012 | Sexton et al. |
| 2012/0057814 A1 | 3/2012 | Dadson et al. |
| 2012/0225253 A1 | 9/2012 | DiGiovanni et al. |
| 2012/0281938 A1 | 11/2012 | Peterson et al. |
| 2013/0004106 A1 | 1/2013 | Wenzel |
| 2013/0092454 A1 | 4/2013 | Scott et al. |
| 2013/0140093 A1 | 6/2013 | Zhou et al. |
| 2013/0146367 A1 | 6/2013 | Zhang et al. |
| 2013/0170778 A1 | 7/2013 | Higginbotham et al. |
| 2014/0037232 A1 | 2/2014 | Marchand et al. |
| 2014/0064646 A1 | 3/2014 | Meier et al. |
| 2014/0254967 A1 | 9/2014 | Gonzalez |
| 2014/0341487 A1 | 11/2014 | Cooley et al. |
| 2014/0355914 A1 | 12/2014 | Cooley et al. |
| 2015/0027713 A1 | 1/2015 | Penisson |
| 2015/0079349 A1 | 3/2015 | Russell et al. |
| 2015/0132539 A1 | 5/2015 | Bailey et al. |
| 2015/0337949 A1 | 11/2015 | Ziegler et al. |
| 2016/0153243 A1 | 6/2016 | Hinz et al. |
| 2016/0186363 A1 | 6/2016 | Merzaghi et al. |
| 2016/0312535 A1 | 10/2016 | Ritchie et al. |
| 2017/0108039 A1 | 4/2017 | Hall et al. |
| 2017/0138224 A1 | 5/2017 | Henry et al. |
| 2017/0234071 A1 | 8/2017 | Spatz et al. |
| 2017/0261031 A1 | 9/2017 | Gonzalez et al. |
| 2018/0087134 A1 | 3/2018 | Chang et al. |
| 2018/0209476 A1 | 7/2018 | Gonzalez |
| 2018/0216661 A1 | 8/2018 | Gonzalez |
| 2018/0264614 A1 | 9/2018 | Winkelmann et al. |
| 2018/0320740 A1 | 11/2018 | Hall et al. |
| 2019/0063495 A1 | 2/2019 | Peterson et al. |
| 2019/0136628 A1 | 5/2019 | Savage et al. |
| 2019/0170186 A1 | 6/2019 | Gonzalez et al. |
| 2020/0031586 A1 | 1/2020 | Miess et al. |
| 2020/0032846 A1 | 1/2020 | Miess et al. |
| 2020/0056659 A1 | 2/2020 | Prevost et al. |
| 2020/0063498 A1 | 2/2020 | Prevost et al. |
| 2020/0063503 A1 | 2/2020 | Reese et al. |
| 2020/0182290 A1 | 6/2020 | Doehring et al. |
| 2020/0325933 A1 | 10/2020 | Prevost et al. |
| 2020/0362956 A1 | 11/2020 | Prevost et al. |
| 2020/0378440 A1 | 12/2020 | Prevost et al. |
| 2021/0140277 A1 | 5/2021 | Hall et al. |
| 2021/0148406 A1 | 5/2021 | Hoyle et al. |
| 2021/0198949 A1 | 7/2021 | Taugvaldstad et al. |
| 2021/0207437 A1 | 7/2021 | Raymond |
| 2021/0222734 A1 | 7/2021 | Gonzalez et al. |

FOREIGN PATENT DOCUMENTS

| | | | |
|---|---|---|---|
| CN | 102128214 B | 12/2012 | |
| CN | 103069099 A | 8/2016 | |
| CN | 109072811 A | 12/2018 | |
| CN | 106678189 A | 11/2023 | |
| DE | 376227 C * | 5/1923 | ............... F16C 1/04 |
| DE | 4226986 A1 | 2/1994 | |
| DE | 29705983 U1 | 6/1997 | |
| DE | 102010052804 A1 | 5/2012 | |
| EP | 0595630 B1 | 1/1998 | |
| EP | 1860016 B1 | 11/2007 | |
| EP | 2592295 A1 | 5/2013 | |
| EP | 1931852 B1 | 1/2018 | |
| FR | 539497 A * | 6/1922 | ............... F16C 1/04 |
| FR | 955966 A * | 1/1950 | ............... F16C 1/04 |
| GB | 156771 A * | 4/1922 | ............... F16D 3/16 |
| GB | 614917 A * | 12/1948 | ............... F16D 3/16 |
| GB | 2514445 B | 6/2015 | |
| JP | S401624 U | 1/1965 | |
| JP | S6061404 A | 4/1985 | |
| JP | H06241232 A | 8/1994 | |
| JP | 2000002315 A | 1/2000 | |
| JP | 2000211717 A | 8/2000 | |
| JP | 2002070507 A | 3/2002 | |
| JP | 2002363616 A | 12/2002 | |
| JP | 2004002912 A | 1/2004 | |
| JP | 2006220282 A | 8/2006 | |
| JP | 2006275286 A | 10/2006 | |
| JP | 2007153141 A | 6/2007 | |
| JP | 2007155041 A | 6/2007 | |
| JP | 2007314091 B1 | 12/2007 | |
| JP | 2008056735 A | 3/2008 | |
| JP | 2010174902 A | 8/2010 | |
| JP | 2018141197 A | 9/2018 | |
| WO | 8700080 A1 | 1/1987 | |
| WO | 2004001238 A2 | 12/2003 | |
| WO | 2006011028 A1 | 2/2006 | |
| WO | 2008133197 A1 | 11/2008 | |
| WO | 2011052231 A1 | 5/2011 | |
| WO | 2013043917 A1 | 3/2013 | |
| WO | 2014014673 A1 | 1/2014 | |
| WO | 2014189763 A1 | 11/2014 | |
| WO | 2016089680 A1 | 6/2016 | |
| WO | 2017105883 A1 | 6/2017 | |
| WO | 2018041578 A1 | 3/2018 | |
| WO | 2018226380 A1 | 12/2018 | |
| WO | 2019096851 A1 | 5/2019 | |
| WO | 2020028188 A1 | 2/2020 | |

OTHER PUBLICATIONS

Bovenkerk, Dr. H. P.; Bundy, Dr. F. P.; Hall, Dr. H. T.; Strong, Dr. H. M.; Wentorf, Jun., Dr. R. H.; Preparation of Diamond, Nature, Oct. 10, 1959, pp. 1094-1098, vol. 184.

Chen, Y.; Nguyen, T; Zhang, L.C.; Polishing of polycrystalline diamond by the technique of dynamic friction-Part 5: Quantitative analysis of material removal, International Journal of Machine Tools & Manufacture, 2009, pp. 515-520, vol. 49, Elsevier.

Chen, Y.; Zhang, L.C.; Arsecularatne, J.A.; Montross, C.; Polishing of polycrystalline diamond by the technique of dynamic friction, part 1: Prediction of the interface temperature rise, International Journal of Machine Tools & Manufacture, 2006, pp. 580-587, vol. 46, Elsevier.

(56) References Cited

OTHER PUBLICATIONS

Chen, Y.; Zhang, L.C.; Arsecularatne, J.A.; Polishing of polycrystalline diamond by the technique of dynamic friction. Part 2: Material removal mechanism, International Journal of Machine Tools & Manufacture, 2007, pp. 1615-1624, vol. 47, Elsevier.

Chen, Y.; Zhang, L.C.; Arsecularatne, J.A.; Zarudi, I., Polishing of polycrystalline diamond by the technique of dynamic friction, part 3: Mechanism exploration through debris analysis, International Journal of Machine Tools & Manufacture, 2007, pp. 2282-2289, vol. 47, Elsevier.

Chen, Y.; Zhang, L.C.; Polishing of polycrystalline diamond by the technique of dynamic friction, part 4: Establishing the polishing map, International Journal of Machine Tools & Manufacture, 2009, pp. 309-314, vol. 49, Elsevier.

Dobrzhinetskaya, Larissa F.; Green, II, Harry W .; Diamond Synthesis from Graphite in the Presence of Water and SiO2: Implications for Diamond Formation in Quartzites from Kazakhstan, International Geology Review, 2007, pp. 389-400, vol. 49.

Element six, The Element Six CVD Diamond Handbook, Accessed on Nov. 1, 2019, 28 pages.

Grossman, David, What the World Needs Now is Superhard Carbon, Popular Mechanics, https://www.popularmechanics.com/science/environment/a28970718/superhard-materials/, Sep. 10, 2019, 7 pages, Hearst Magazine Media, Inc.

Liao, Y.; Marks, L.; In situ single asperity wear at the nanometre scale, International Materials Reviews, 2016, pp. 1-17, Taylor & Francis.

Linear Rolling Bearings ME EN 7960—Precision Machine Design Topic 8, Presentation, Accessed on Jan. 26, 2020, 23 Pages, University of Utah.

Machinery's Handbook 30th Edition, Copyright Page and Coefficients of Friction Page, 2016, p. 158 (2 Pages total), Industrial Press, Inc., South Norwalk, U.S.A.

Machinery's Handbook, 2016, Industrial Press, INC., 30th edition, pp. 843 and 1055 (6 pages total).

McCarthy, J. Michael; Cam and Follower Systems, PowerPoint Presentation, Jul. 25, 2009, pp. 1-14, UCIrvine The Henry Samueli School of Engineering.

McGill Cam Follower Bearings brochure, 2005, p. 1-19, Back Page, Brochure MCCF-05, Form #8991 (20 Pages total).

Motion & Control NSK Cam Followers (Stud Type Track Rollers) Roller Followers (Yoke Type Track Rollers) catalog, 1991, Cover Page, pp. 1-18, Back Page, CAT. No. E1421 2004 C-11, Japan.

Product Catalogue, Asahi Diamond Industrial Australia Pty. Ltd., accessed on Jun. 23, 2018, Cover Page, Blank Page, 2 Notes Pages, Table of Contents, pp. 1-49 (54 Pages total).

RBC Aerospace Bearings Rolling Element Bearings catalog, 2008, Cover Page, First Page, pp. 1-149, Back Page (152 Pages total).

RGPBalls Ball Transfer Units catalog, accessed on Jun. 23, 2018, pp. 1-26, 2 Back Pages (28 Pages total).

Sandvik Coromant Hard part turning with CBN catalog, 2012, pp. 1-42, 2 Back Pages (44 Pages total).

Sexton, Timothy N.; Cooley, Craig H.; Diamond Bearing Technology for Deep and Geothermal Drilling, PowerPoint Presentation, 2010, 16 Pages.

SKF Ball transfer units catalog, Dec. 2006, Cover Page, Table of Contents, pp. 1-36, 2 Back Pages (40 Pages total), Publication 940-711.

Sowers, Jason Michael, Examination of the Material Removal Rate in Lapping Polycrystalline Diamond Compacts, A Thesis, Aug. 2011, 2 Cover Pages, pp. iii-xiv, pp. 1-87 (101 Pages total).

Sun, Liling; Wu, Qi; Dai, Daoyang; Zhang, Jun; Qin, Zhicheng; Wang, Wenkui; Non-metallic catalysts for diamond synthesis under high pressure and high temperature, Science in China (Series A), Aug. 1999, pp. 834-841, vol. 42 No. 8, China.

Superhard Material, Wikipedia, https://en.wikipedia.org/wiki/Superhard_material, Retrieved from https://en.wikipedia.org/w/index.php?title=Superhard_material&oldid=928571597, Nov. 30, 2019, 14 pages.

Surface Finish, Wikipedia, https://en.wikipedia.org/wiki/Surface_finish, Retrieved from https://en.wikipedia.org/w/index.php?title=Surface_finish&oldid=919232937, Oct. 2, 2019, 3 pages.

United States Defensive Publication No. T102,901, published Apr. 5, 1983, in U.S. Appl. No. 298,271 [2 Pages].

USSynthetic Bearings and Waukesha Bearings brochure for Diamond Tilting Pad Thrust Bearings, 2015, 2 Pages.

USSynthetic Bearings brochure, accessed on Jun. 23, 2018, 12 Pages, Orem, Utah.

Zeidan, Fouad Y.; Paquette, Donald J., Application of High Speed and High Performance Fluid Film Bearings in Rotating Machinery, 1994, pp. 209-234.

Zhigadlo, N. D., Spontaneous growth of diamond from MnNi solvent-catalyst using opposed anvil-type high-pressure apparatus, accessed on Jun. 28, 2018, pp. 1-12, Laboratory for Solid State Physics, Switzerland.

Zou, Lai; Huang, Yun; Zhou, Ming; Xiao, Guijian; Thermochemical Wear of Single Crystal Diamond Catalyzed by Ferrous Materials at Elevated Temperature, Crystals, 2017, pp. 1-10, vol. 7.

Anonymous: "Chemical vapor deposition—Wikipedia", Dec. 27, 2023, Retrieved from the Internet on Feb. 9, 2024, https://en.wikipedia.org/wiki/Chemical_vapor_deposition#Diamond (14 pages).

Anonymous: "CVD Diamond—FAQ", Feb. 8, 2024, Retrieved from the Internet on Feb. 9, 2024, http://www.cvd-diamond.com/faq_en.htm (4 pages).

Anonymous: "Diamond-like carbon—Wikipedia", Jan. 9, 2024, Retrieved from the Internet on Feb. 9, 2024, https://en.wikipedia.org/wiki/Diamond-like_carbon (10 pages).

International Preliminary Report on Patentability mailed Oct. 24, 2024 (issued in PCT Application No. PCT/US23/65667) [7 pages].

* cited by examiner

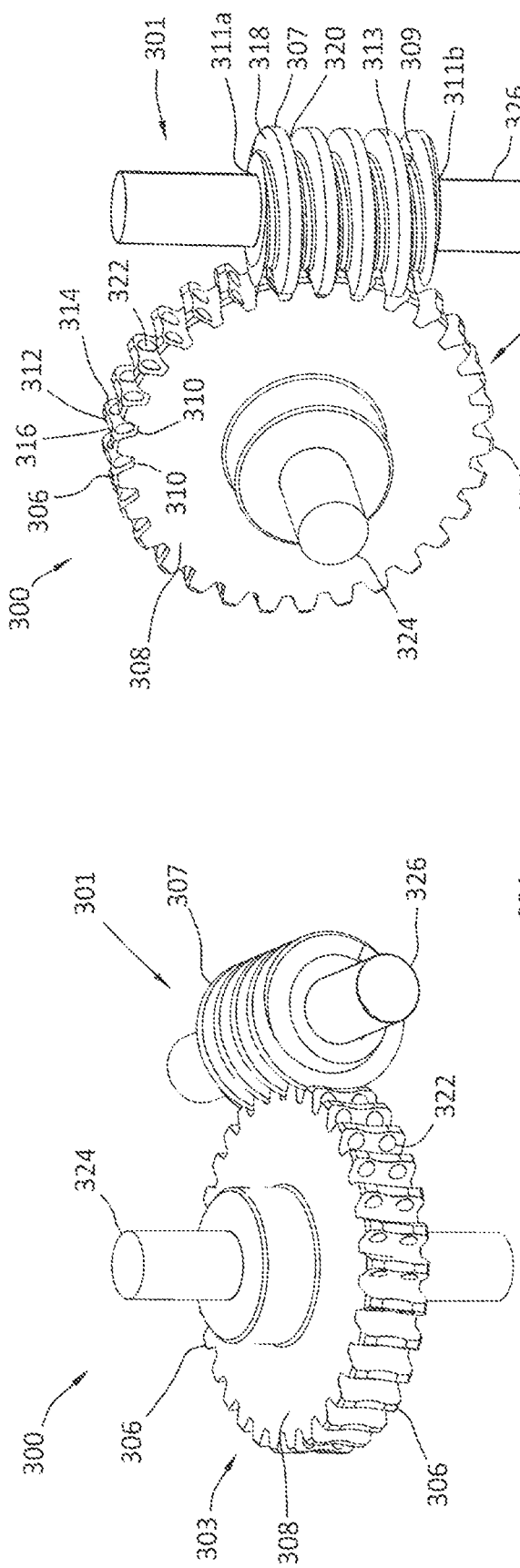
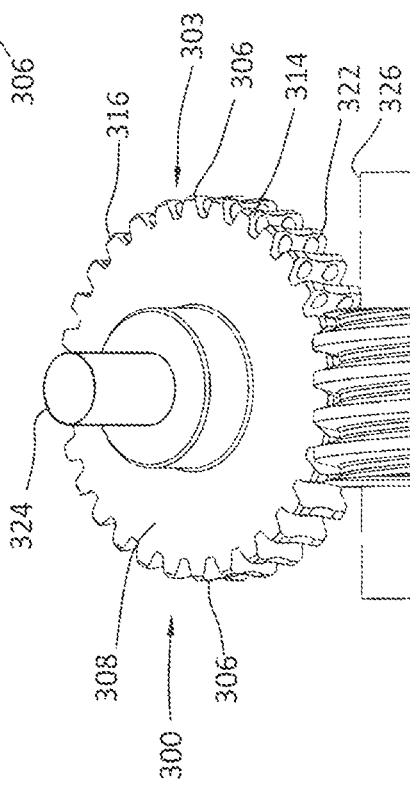
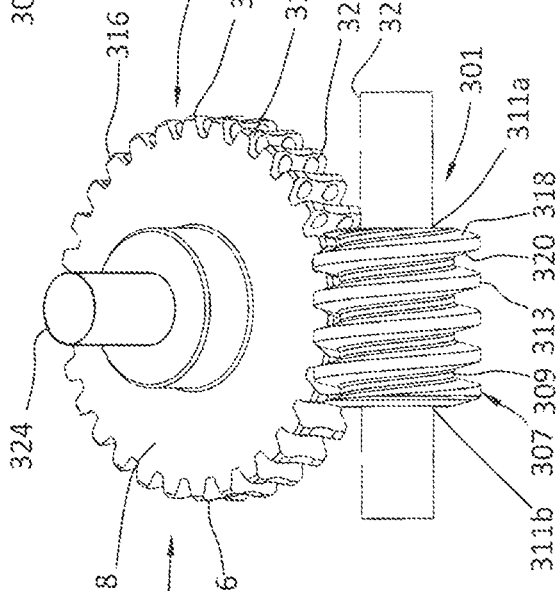
FIG. 3A
FIG. 3B
FIG. 3C

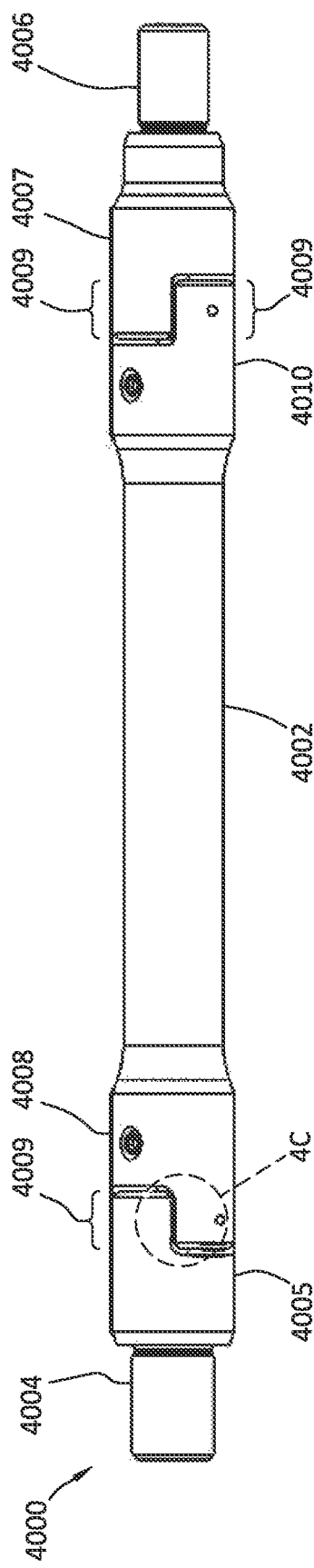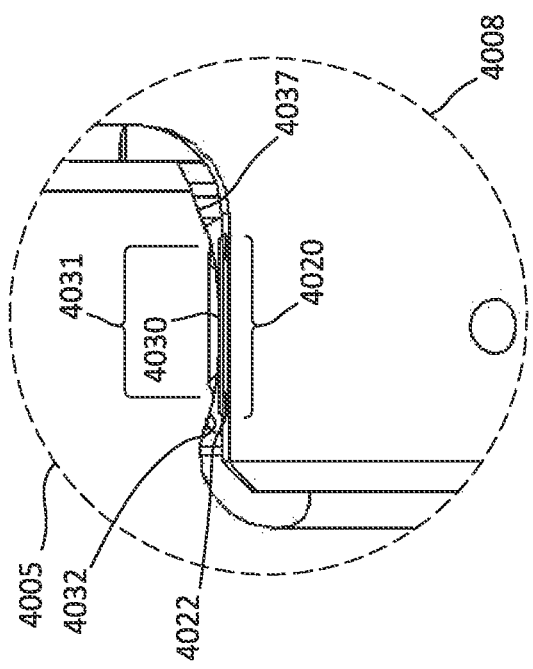
FIG. 4B
FIG. 4C

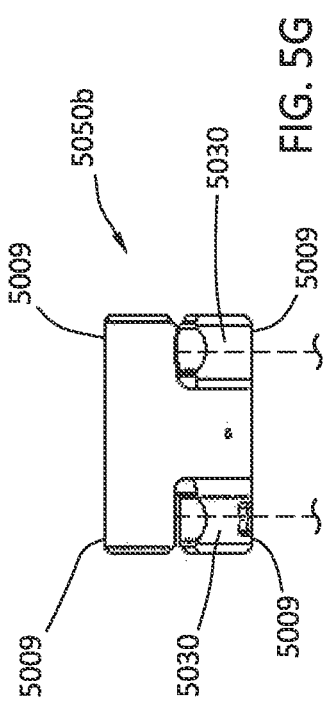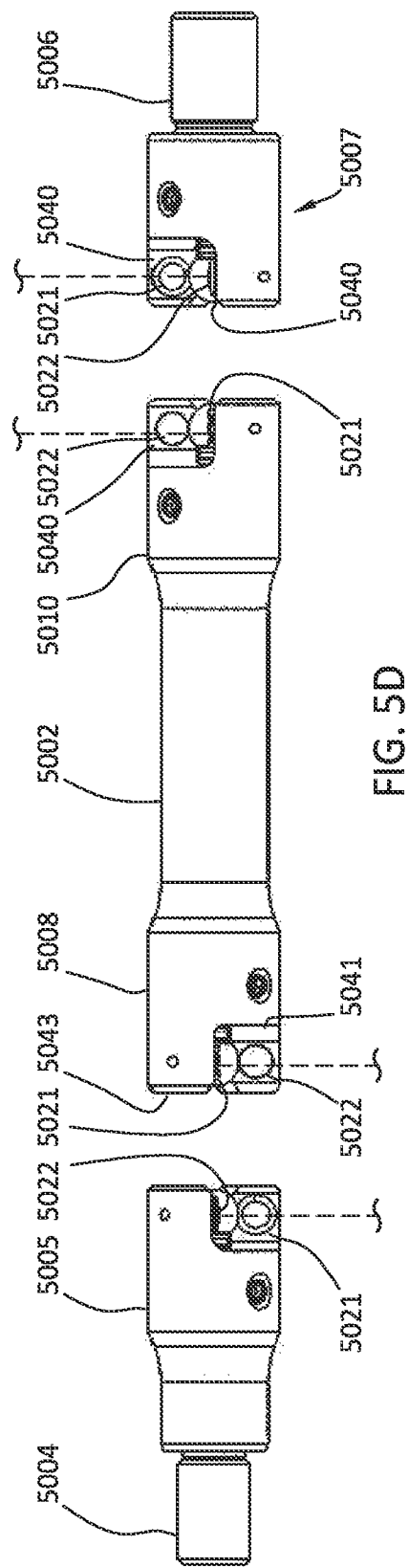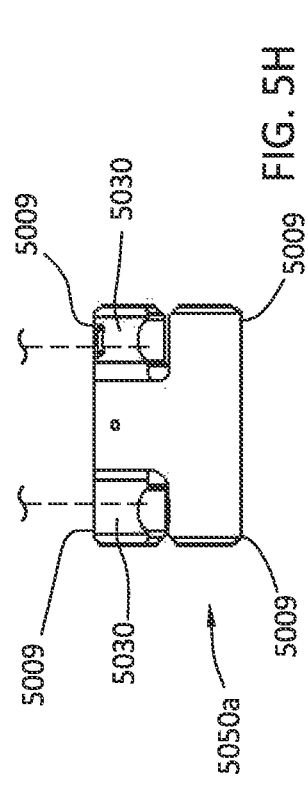

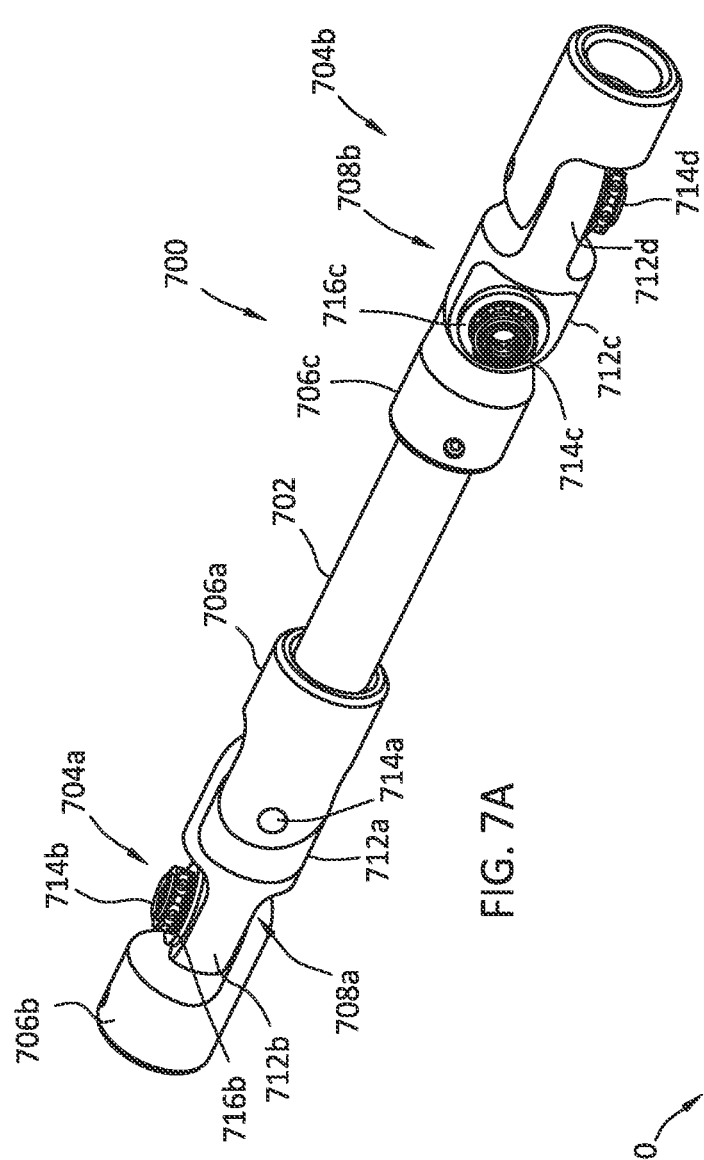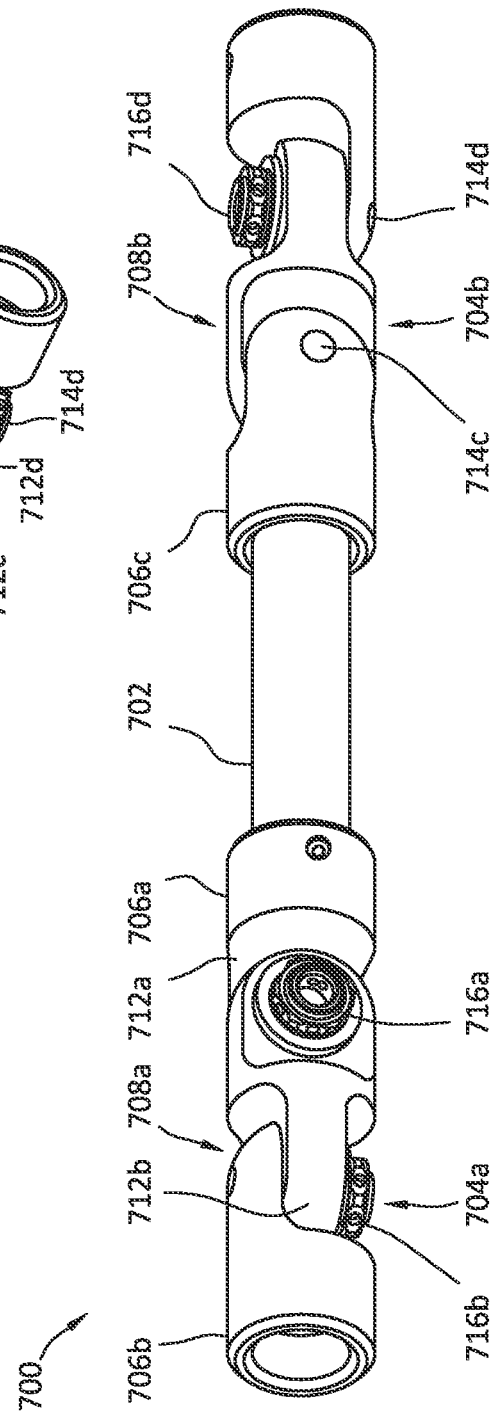
FIG. 7A
FIG. 7B

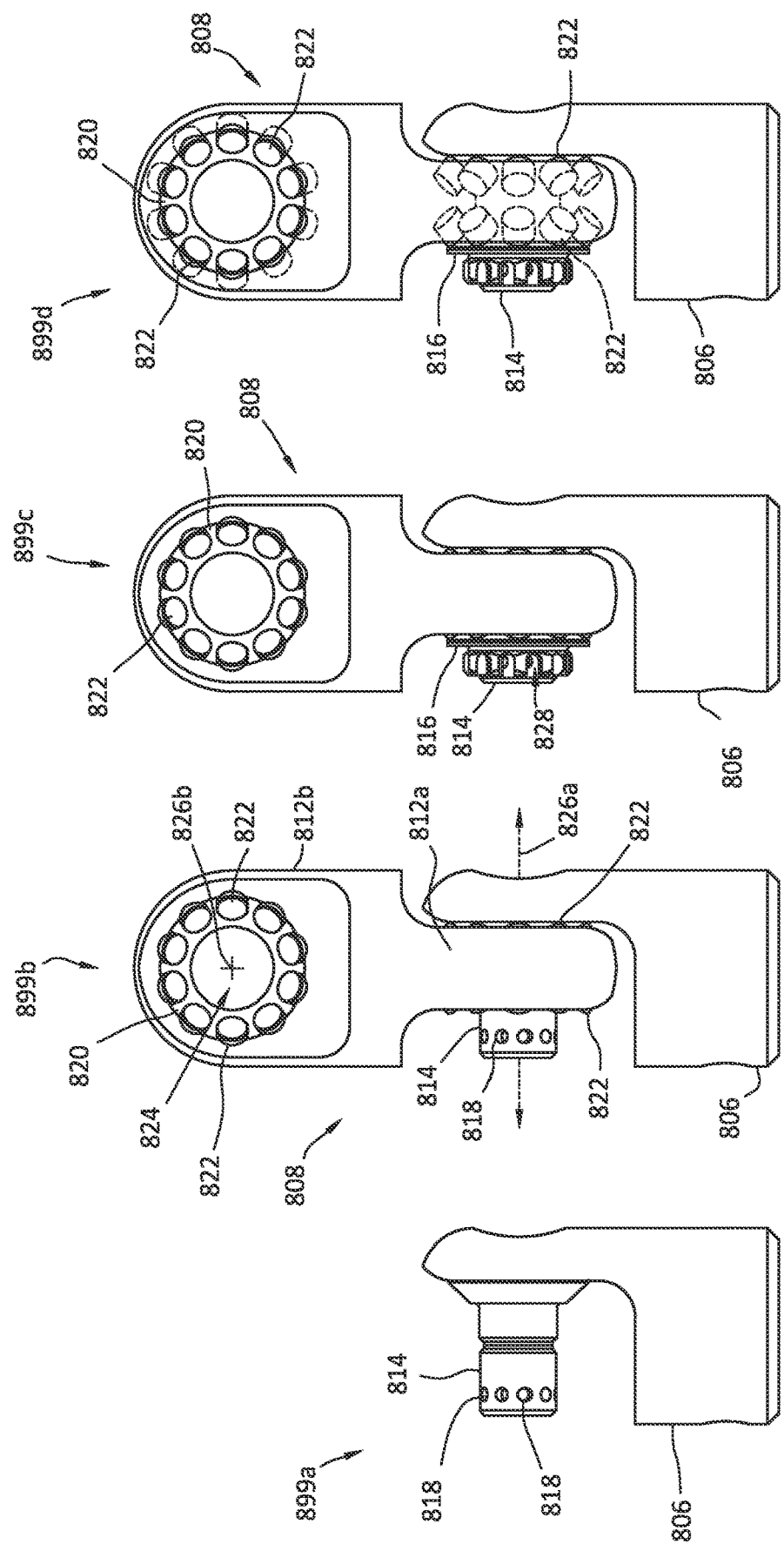

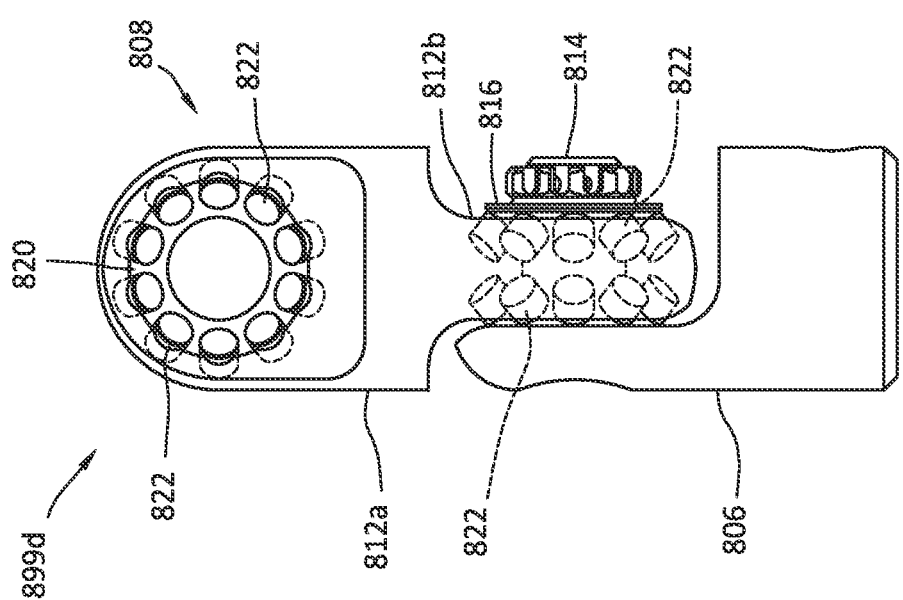
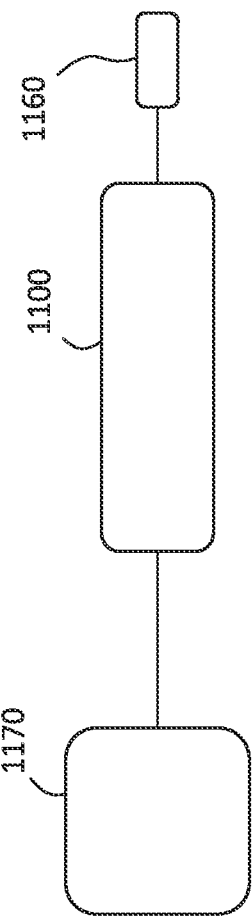
FIG.11
FIG.8E

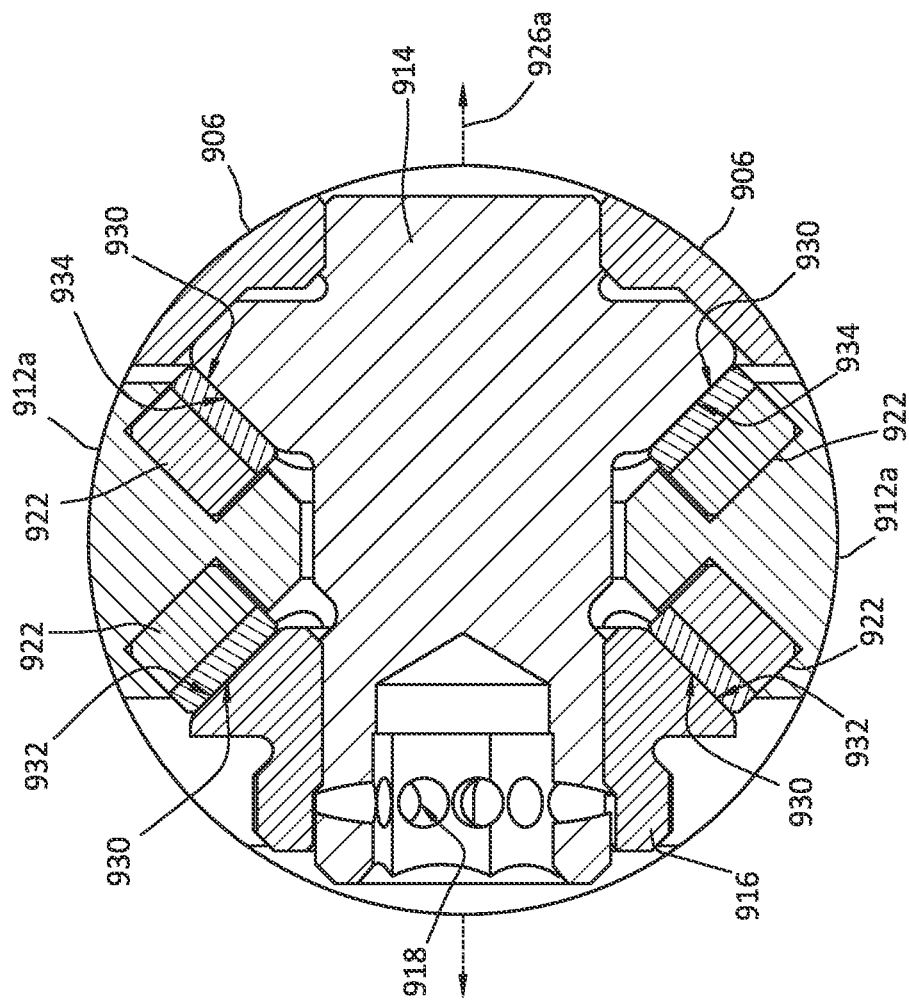
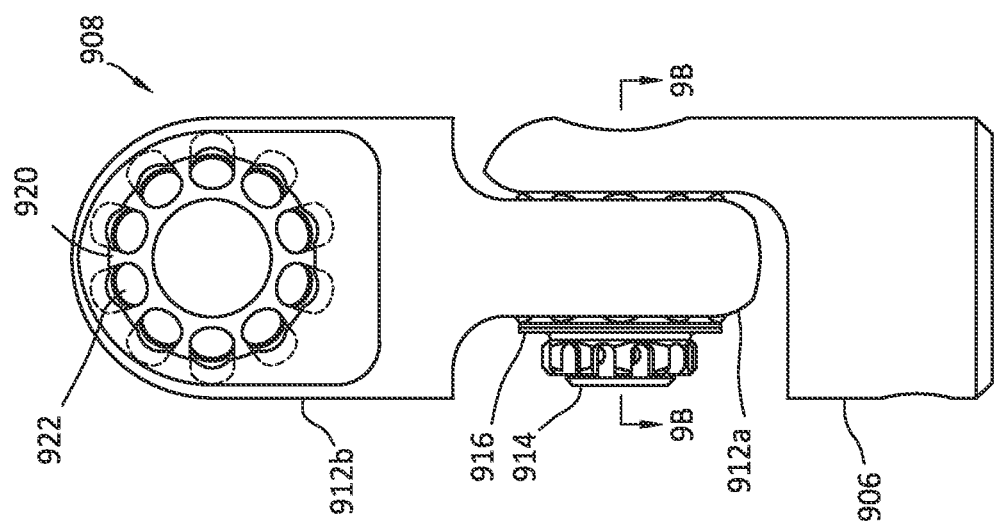
FIG. 9B
FIG. 9A

DRIVELINE WITH DOUBLE CONICAL BEARING JOINTS HAVING POLYCRYSTALLINE DIAMOND POWER TRANSMISSION SURFACES

CROSS-REFERENCE TO RELATED APPLICATIONS

The present application claims the benefit of U.S. Provisional Patent Application No. 63/064,272, filed on Aug. 11, 2020, and entitled "Driveline with Double Conical Bearing Joints having Polycrystalline Diamond Power Transmission Surfaces," the entirety of which is incorporated herein by reference. The present application is also a Continuation-in-Part of U.S. patent application Ser. No. 17/331,399, filed on May 26, 2021, which itself is a Continuation of U.S. Pat. No. 11,054,000, issued on Jul. 6, 2021, the entireties of which are incorporated herein by reference.

FIELD

The present disclosure relates to polycrystalline diamond for use as a power transmission surface in a driveline; to systems including the same; and to methods of making and using the same.

BACKGROUND

Mechanical power transmission systems transmit mechanical energy from one component or system to another component or system, such as to perform work. Mechanical power transmission systems can include a first component (e.g., a first gear) coupled with a second component (e.g., a second gear), such that when the first component moves at least some of the mechanical energy of the first component is transferred to the second component, causing the second component to correspondingly move. Often such systems include surfaces that are engaged with one another. For example, during movement of a first gear that is meshed with a second gear, at least a portion of the surfaces of the gear teeth of the first gear come into contact with at least a portion of the surfaces of the gear teeth of the second gear. However, mechanical power transmission systems, such as gears, are subject to failures, including material failures resulting from engagement between surfaces. Some exemplary types of gear failures include bending fatigue, contact fatigue, wear, scuffing, overload, and cracking.

Some drivelines use gear joint teeth, which do not function well when misalignment is present in the driveline. Also, such drivelines require sealing and lubrication to function properly.

When polycrystalline diamond (PCD) elements are used in moving parts, such as rotating machinery, typically both the engagement surface and the opposing engagement surface are composed of polycrystalline diamond. This is, at least in part, because thermally stable polycrystalline diamond (TSP), either supported or unsupported by tungsten carbide, and polycrystalline diamond compact (PDC) have been considered as contraindicated for use in the machining of diamond reactive materials. Diamond reactive materials include metals, metal alloys, and composites (e.g., in the form of hardfacings, coatings, or platings) that contain more than trace amounts of diamond catalyst or solvent elements (also referred to as diamond solvent-catalysts or diamond catalyst-solvents) including iron, cobalt, nickel, ruthenium, rhodium, palladium, chromium, manganese, copper, titanium, or tantalum. Further, this prior contraindication of the use of polycrystalline diamond extends to so called "superalloys," including iron-based, cobalt-based and nickel-based superalloys containing more than trace amounts of diamond catalyst or solvent elements. At certain surface speeds in moving parts, load and attendant temperature generated, such as at a cutting tip, often exceeds the graphitization temperature of diamond (i.e., about 700° C.), which can, in the presence of diamond catalyst or solvent elements, lead to rapid wear and failure of components. Without being bound by theory, the specific failure mechanism is believed to result from the chemical interaction of the carbon bearing diamond with the carbon attracting material that is being machined. An exemplary reference concerning the contraindication of polycrystalline diamond for diamond catalyst or solvent containing metal or alloy machining is U.S. Pat. No. 3,745,623. The contraindication of polycrystalline diamond for machining diamond catalyst or diamond solvent containing materials has long caused the avoidance of the use of polycrystalline diamond in all contacting applications with such materials.

BRIEF SUMMARY

Some embodiments of the present disclosure include a driveline. The driveline includes a drive shaft having a first end and a second end. A first bearing coupler is coupled with the first end of the drive shaft. The first bearing coupler has a bearing surface including a material that contains at least 2 weight percent of diamond solvent-catalyst based on a total weight of the material. A first double conical joint is coupled with the first bearing coupler. The first double conical joint includes a first conical joint having at least one conical bearing surface with polycrystalline diamond bearing surfaces thereon. A second conical joint is coupled with the first conical joint. The second conical joint includes at least one conical bearing surface having polycrystalline diamond bearing surfaces thereon. The first conical joint is rotatably coupled with the first bearing coupler such that the polycrystalline diamond bearing surfaces of the first conical joint are in sliding contact with the bearing surface of the first bearing coupler.

Some embodiments of the present disclosure include a method of driving a machine. The method includes providing a driveline. The driveline includes a first double conical joint on a first end thereof and a second double conical joint on a second end thereof. The method includes coupling a first bearing coupler between the first double conical joint and a prime mover such that a bearing surface of the first bearing coupler is in sliding contact with a polycrystalline diamond bearing surface of the first double conical joint. The bearing surface of the first bearing coupler includes a material that contains at least 2 weight percent of diamond solvent-catalyst based on a total weight of the material. The method includes coupling a second bearing coupler between the second double conical joint and a machine such that a bearing surface of the second bearing coupler is in sliding contact with a polycrystalline diamond bearing surface of the second double conical joint. The bearing surface of the second bearing coupler includes a material that contains at least 2 weight percent of diamond solvent-catalyst based on a total weight of the material. The method includes driving rotation of the driveline with the prime mover, and driving the machine with the rotating driveline.

Some embodiments of the present disclosure include a system. The system includes a driveline having a first double conical joint on a first end thereof and a second double conical joint on a second end thereof. The system includes a prime mover, and a first bearing coupler positioned between the first double conical joint and the prime mover. A bearing surface of the first bearing coupler is in sliding contact with a polycrystalline diamond bearing surface of the first double conical joint. The bearing surface of the first bearing coupler includes a material that contains at least 2 weight percent of diamond solvent-catalyst based on a total weight of the material. The system includes a machine, and a second bearing coupler positioned between the second double conical joint and the machine such that a bearing surface of the second bearing coupler is in sliding contact with a polycrystalline diamond bearing surface of the second double conical joint. The bearing surface of the second bearing coupler includes a material that contains at least 2 weight percent of diamond solvent-catalyst based on a total weight of the material. The prime mover is configured to drive rotation of the driveline, and the driveline is configured to drive the machine.

Some embodiments include a driveline with double conical joints. The driveline includes a shaft having a first end and a second end. A bearing coupler is coupled with the shaft at the first end. The bearing coupler has a bearing surface including a material that contains at least 2 wt. % diamond solvent-catalyst based on a total weight of the material. The driveline includes a double conical joint including a first conical joint and a second conical joint. The first and second conical joints each include conical bearing surfaces having polycrystalline diamond bearing surfaces thereon. The first conical joint is rotatably coupled with the bearing coupler such that the polycrystalline diamond bearing surfaces of the first conical joint are in sliding contact with the bearing surface of the bearing coupler.

BRIEF DESCRIPTION OF THE DRAWINGS

So that the manner in which the features and advantages of the systems, apparatus, and/or methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 3A depicts a worm gear meshed with a worm (also referred to as a worm screw), with the worm gear having polycrystalline diamond power transmission surfaces thereon.

FIG. 3B depicts another view of the worm gear meshed with the worm of FIG. 3A.

FIG. 3C depicts another view of the worm gear meshed with the worm of FIG. 3A.

FIG. 4B is an assembled view of the portion of the driveline of FIG. 4A.

FIG. 4C is a detail view of a portion of FIG. 4B.

FIG. 5D is a disassembled view of the driveline of FIG. 5A.

FIG. 5G and FIG. 5H depict disassembled portions of the driveline of FIG. 5D.

FIG. 7A is a perspective view of a driveline including double conical joints with polycrystalline diamond power transmission surfaces.

FIG. 7B depicts a driveline including double conical joints with polycrystalline diamond power transmission surfaces.

FIGS. 8A-8E depict portions of a driveline, including double conical joints with polycrystalline diamond power transmission surfaces, at various stages of assembly of the driveline.

FIG. 9A is a side view of a portion of a driveline including double conical joints with polycrystalline diamond power transmission surfaces.

FIG. 9B is a cross sectional view of the driveline of FIG. 9A, along line 9B-9B.

FIG. 11 is a simplified schematic of a system including the driveline having double conical joints with polycrystalline diamond power transmission surfaces, with the driveline coupled between a prime mover and a machine.

DETAILED DESCRIPTION

Figure 1A:
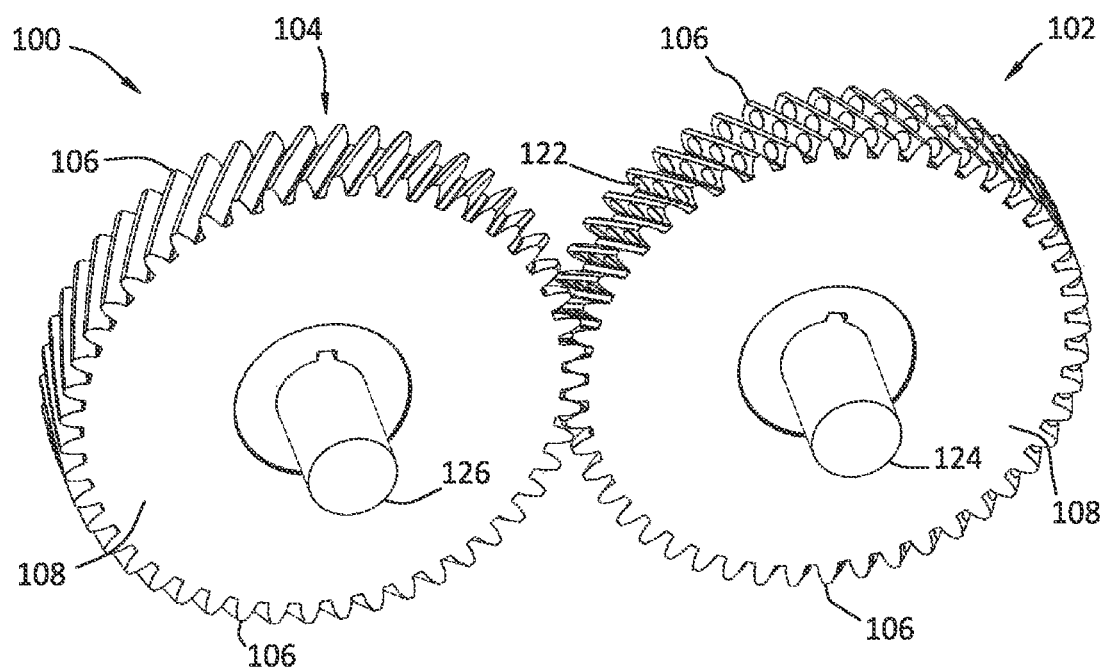
FIG. 1A depicts meshed, helical gears with one of the helical gears having polycrystalline diamond power transmission surfaces thereon.
Figure 1B:
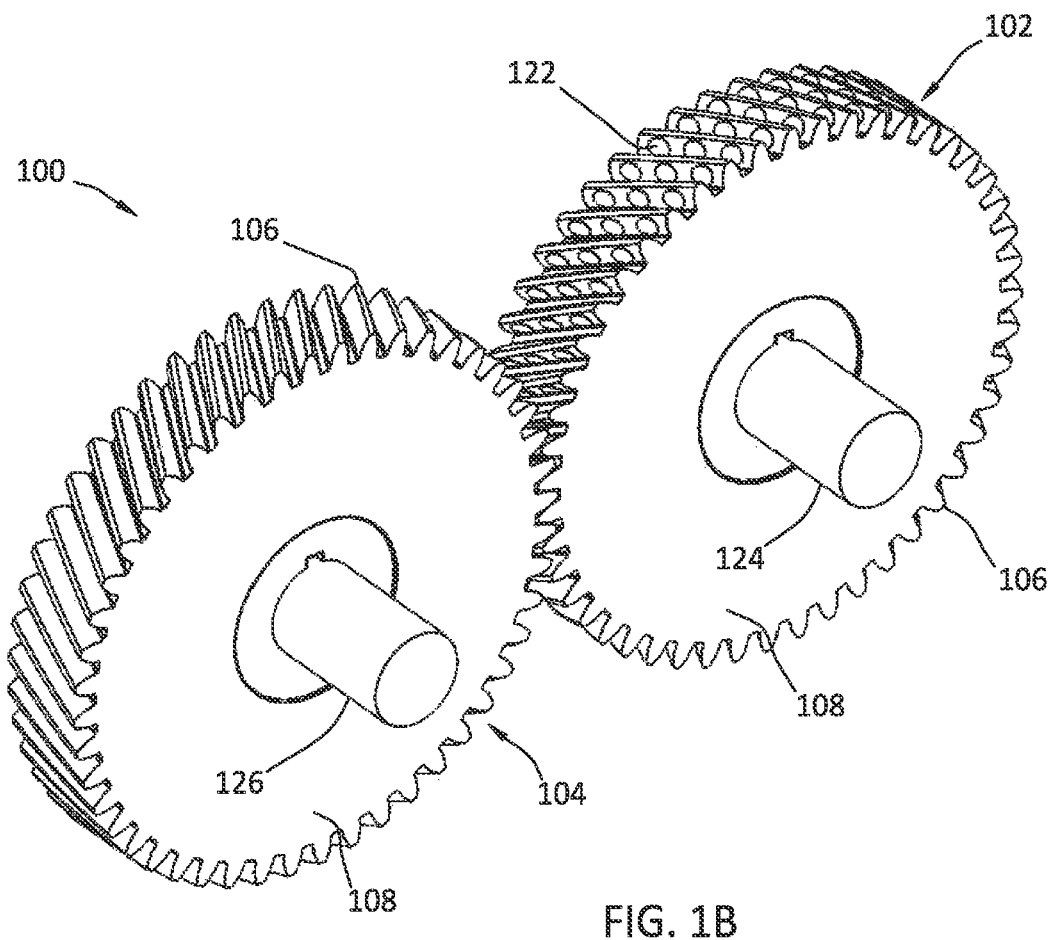
FIG. 1B depicts another view of the meshed, helical gears of FIG. 1A.
Figure 1C:
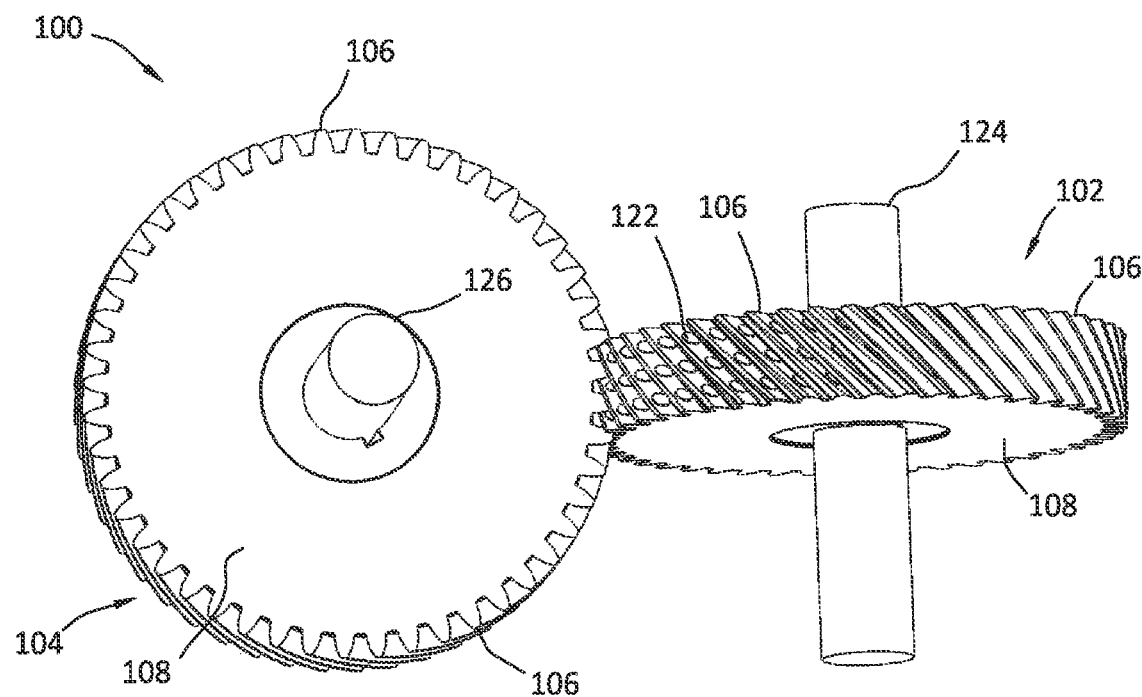
FIG. 1C depicts the meshed, helical gears the same as FIG. 1A, but coupled at a right angle.

Certain embodiments of the present disclosure include methods and apparatus for providing power transmission systems with polycrystalline diamond power transmission surfaces. The power transmission systems disclosed herein include, but are not limited to, gears and drivelines. The gears disclosed herein include, but are not limited to, helical gears, spur gears, and worm drives. The drivelines disclosed herein include, but are not limited to, mechanical couplings, including flexible mechanical couplings, between moving parts. The drivelines disclosed herein may include shaft couplings. In one exemplary embodiment, the drivelines disclosed herein include universal joints (e.g., single universal joints or single Cardan universal joints or double Cardan universal joints). The power transmission systems disclosed herein may be a component of a larger system, such as a drilling motor or a portion of a drivetrain. The power transmission systems disclosed herein are not limited to the particular applications discussed herein, and may be incorporated into other machinery that includes gears, drivelines, or other power transmission systems that include power transmission surfaces.

Power transmission surfaces (also referred to as power transfer surfaces) are surfaces of components within a power transmission system that engage surfaces for the transfer of mechanical energy (e.g., via the transfer of torque) between the components. For example, in a power transmission system that includes two gears that are meshed together, the power transmission surfaces include the gear tooth surfaces of the meshed gears that are or come into contact with one another during movement of the gears. Within this disclosure, when referring to engaged power transmission surfaces (e.g., meshed gear teeth), one power transmission surface may be referred to as a "power transmission surface" while the other may be referred to as an "opposing power transmission surface."

The present disclosure includes engaged power transmission surfaces where one of the power transmission surfaces includes polycrystalline diamond and the other, opposing power transmission surface does not include polycrystalline diamond. As described in more detail below, in some embodiments a first power transmission surface includes polycrystalline diamond, and a second, opposing power transmission surface includes diamond solvent-catalyst. In some embodiments, the opposing power transmission surface is a treated surface in accordance with U.S. Pat. No. 11,035,407. For example, the opposing power transmission surface (also referred to as the opposing engagement surface) may be hardened, such as via cold working and work hardening processes including burnishing and shot peening; and/or heat-treating processes including through hardening, case hardening, and subzero, cryogenic, deep freezing treatments. Also, the opposing power transmission surface may be plated and/or coated, such as via electroplating, electroless plating, including chromium plating, phosphating, vapor deposition, including physical vapor deposition (PVD) and chemical vapor deposition (CVD); or anodizing. Also, the opposing power transmission surface may be cladded, such as via roll bonding, laser cladding, or explosive welding.

In some embodiments, the power transmission surfaces disclosed herein are a portion of a motor, such as a drilling motor for downhole drilling, including directional drilling, such as a mud motor. The power transmission surfaces disclosed herein may be a surface of a gear (e.g., of a gearbox). While described in reference to downhole drilling applications, the power transmission surfaces disclosed herein may also be used in other applications. In some embodiments, the power transmission surfaces disclosed herein are a portion of a turbine, pump, compressor, mining equipment, construction equipment, combustion engine, windmill, automotive part, aircraft part, marine equipment, transmissions, rail cars, hard drives, centrifuges, medical equipment, robotics, machine tools, amusement rides, amusement devices, brakes, clutches, motors, or other assemblies that include power transmission systems.

Definitions, Examples, and Standards

Diamond Reactive Materials—As used herein, a "diamond reactive material" is a material that contains more than trace amounts of diamond catalyst or diamond solvent, which are also referred to as "diamond catalyst-solvent," "catalyst-solvent," "diamond solvent-catalyst," or "solvent-catalyst." Some examples of known diamond solvent-catalysts are disclosed in: U.S. Pat. Nos. 6,655,845; 3,745,623; 7,198,043; 8,627,904; 5,385,715; 8,485,284; 6,814,775; 5,271,749; 5,948,541; 4,906,528; 7,737,377; 5,011,515; 3,650,714; 2,947,609; and 8,764,295. As used herein, a diamond reactive material that contains more than "trace amounts" of diamond solvent-catalyst is a material that contains at least 2 percent by weight (wt. %) diamond solvent-catalyst based on a total weight of the material. The diamond reactive materials disclosed herein may contain from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond solvent-catalyst based on a total weight of the diamond reactive material. As would be understood by one skilled in the art, diamond solvent-catalysts are chemical elements, compounds, or materials (e.g., metals) that are capable of reacting with polycrystalline diamond (e.g., catalyzing and/or solubilizing), resulting in the graphitization of the polycrystalline diamond, such as under load and at a temperature at or exceeding the graphitization temperature of diamond (i.e., about 700° C.). Thus, diamond reactive materials include materials that, under load and at a temperature at or exceeding the graphitization temperature of diamond, can lead to wear, sometimes rapid wear, and failure of components formed of or including polycrystalline diamond, such as diamond tipped tools. Diamond reactive materials include, but are not limited to, metals, metal alloys, and composite materials that contain more than trace amounts of diamond solvent-catalysts. The diamond reactive materials may be in the form of hardfacings, coatings, or platings. Some exemplary diamond solvent-catalysts include iron, cobalt, nickel, ruthenium, rhodium, palladium, chromium, manganese, copper, titanium, tantalum, and alloys thereof. Thus, a diamond reactive material may be a material that includes more than trace amounts (i.e., more than 2 wt. %) of iron, cobalt, nickel, ruthenium, rhodium, palladium, chromium, manganese, copper, titanium, tantalum, or alloys thereof. One exemplary diamond reactive material is steel.

The diamond reactive material may be a superalloy including, but not limited to, an iron-based superalloy, a cobalt-based superalloy, or a nickel-based superalloy.

In some embodiments, the diamond reactive material is not and/or does not include (i.e., specifically excludes) so called "superhard materials." As would be understood by one skilled in the art, "superhard materials" are a category of materials defined by the hardness of the material, which may be determined in accordance with the Brinell, Rockwell, Knoop and/or Vickers scales. For example, superhard materials include materials with a hardness value exceeding 40 gigapascals (GPa) when measured by the Vickers hardness test. As used herein, "superhard materials" are materials that are at least as hard as tungsten carbide, including tungsten carbide tiles and cemented tungsten carbide, such as is determined in accordance with one of these hardness scales. One skilled in the art would understand that a Brinell scale test may be performed, for example, in accordance with ASTM E10-18; the Vickers hardness test may be performed, for example, in accordance with ASTM E92-17; the Rockwell hardness test may be performed, for example, in accordance with ASTM E18; and the Knoop hardness test may be performed, for example, in accordance with ASTM E384-17. The "superhard materials" disclosed herein include, but are not limited to, tile tungsten carbide, cemented tungsten carbide, infiltrated tungsten carbide matrix, silicon carbide, silicon nitride, cubic boron nitride, and polycrystalline diamond. Thus, in some aspects, the "diamond reactive material" is partially or entirely composed of material(s) (e.g., metal, metal alloy, composite) that is softer (less hard) than superhard materials, such as less hard than tungsten carbide (e.g., tile or cemented), as determined in accordance with one of these hardness tests, such as the Brinell scale.

Interfacing Polycrystalline Diamond with Diamond Reactive Materials—In some embodiments, the present disclosure provides for interfacing the contact between a first power transmission surface that includes a polycrystalline diamond surface and a second power transmission surface that includes a diamond reactive material surface. For example, the polycrystalline diamond surface may be positioned and arranged on or as the first power transmission surface for sliding and/or rolling contact with the diamond reactive material surface. As used herein, "engagement surface" refers to the surface of a material or component (e.g., polycrystalline diamond or diamond reactive material) that is positioned and arranged within a power transmission system such that, in operation of the power transmission system (e.g., a gearbox), the engagement surface interfaces the contact between two components (e.g., between two gears in a gearbox). In some embodiments, the power transmission surface disclosed herein is in direct contact with an opposing power transmission surface (i.e., boundary lubrication), without a fluid film therebetween. In some embodiments, a fluid film may develop (i.e., hydrodynamic lubrication) between the power transmission surface and the opposing power transmission surface such that the surfaces are not directly in contact with one another, but are engaged through the fluid film. In some aspects, the contact between the power transmission surface and opposing power transmission surface is between (or a mixture of) direct contact and fluid film (i.e., mixed boundary lubrication).

Lapped or Polished—In certain applications, the polycrystalline diamond, or at least the engagement surface thereof, is lapped or polished, optionally highly lapped or highly polished. Although highly polished polycrystalline diamond is used in at least some applications, the scope of this disclosure is not limited to highly polished polycrystalline diamond and includes polycrystalline diamond that is highly lapped or polished. As used herein, a surface is defined as "highly lapped" if the surface has a surface finish of 20 µin or about 20 µin, such as a surface finish ranging from about 18 to about 22 µin. As used herein, a surface is defined as "polished" if the surface has a surface finish of less than about 10 µin, or of from about 2 to about 10 µin. As used herein, a surface is defined as "highly polished" if the surface has a surface finish of less than about 2 µin, or from about 0.5 µin to less than about 2 µin. In some aspects, the polycrystalline diamond engagement surfaces disclosed herein have a surface finish ranging from 0.5 µin to 40 µin, or from 2 µin to 30 µin, or from 5 µin to 20 µin, or from 8 µin to 15 µin, or less than 20 µin, or less than 10 µin, or less than 2 µin, or any range therebetween. Without being bound by theory, it is believed that polycrystalline diamond that has been polished to a surface finish of 0.5 µin has a coefficient of friction that is about half of standard lapped polycrystalline diamond with a surface finish of 20-40 µin. U.S. Pat. Nos. 5,447,208 and 5,653,300 to Lund et al. provide disclosure relevant to polishing of polycrystalline diamond. As would be understood by one skilled in the art, surface finish, also referred to as surface texture or surface topography, is a characteristic of a surface as defined by lay, surface roughness, and waviness. Surface finish may be determined in accordance with ASME B46.1-2009. Surface finish may be measured with a profilometer, laser microscope, or with Atomic Force Microscopy, for example. In some embodiments, the opposing engaging surface has a surface finish of from 0.5 to 2,000 µin, or from 1 to 1,900 µin, or from 5 to 1,500 µin, or from 10 to 1,200 µin, or from 50 to 1,000 µin, or from 100 to 800 µin, or from 200 to 600 µin. In some embodiments, the opposing engagement surface has a surface finish that is greater than the engagement surface (i.e., rougher).

Helical Gears

Some embodiments of the present disclosure include power transmission systems that include meshed gears or cogwheels. In one exemplary embodiment, the meshed gears are helical gears.

Figure 1D:
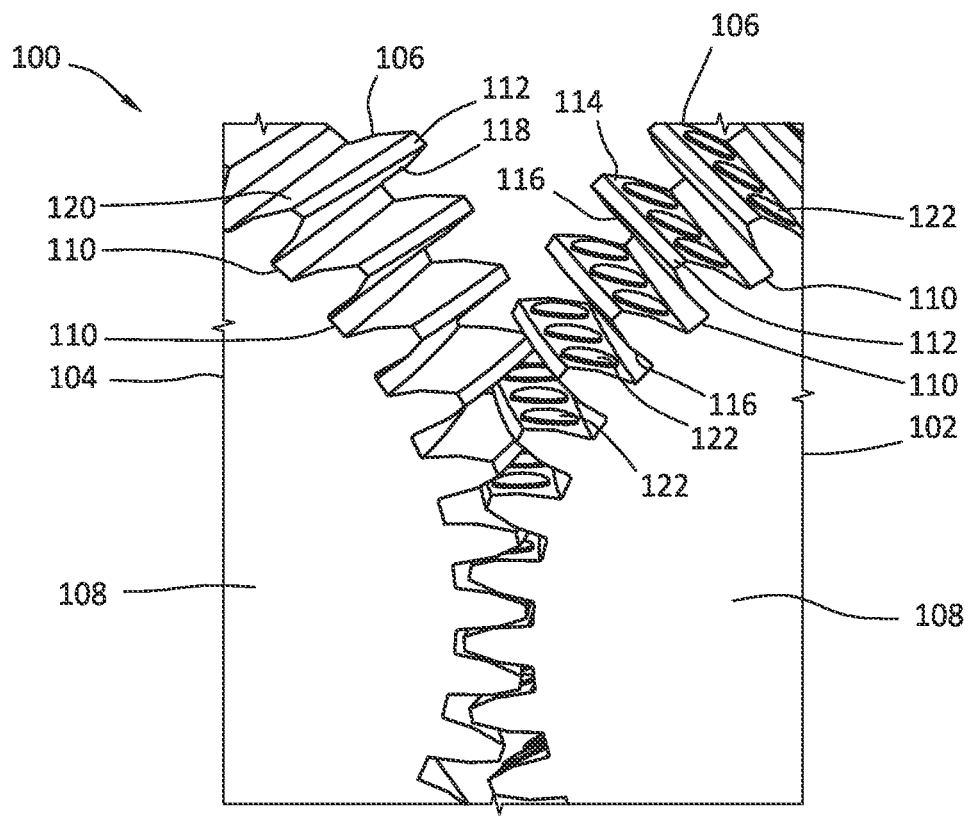
FIG. 1D depicts a detail view of meshed, helical gears of FIG. 1A.

With reference to FIGS. 1A-1D, pairs of meshed helical gears are depicted. Meshed gears 100 may be a portion of a power transmission system. Meshed gears 100 include first gear 102 and second gear 104, each of which is a helical gear. First gear 102 and second gear 104 are meshed together such that, in operation, mechanical power is transferred from one of first gear 102 and second gear 104 to the other of first gear 102 and second gear 104. Each of first gear 102 and second gear 104 includes a plurality of teeth 106 protruding from a gear body 108 and extending about the outer circumference thereof. As shown in FIG. 1D, each gear tooth 106 extends from gear body 108 between two adjacent root surfaces 110, and includes a gear top land 112. Each gear tooth 106 of first gear 102 includes a first gear tooth surface 114 extending from one adjacent root surface 110 to the gear top land 112 thereof, and a second gear tooth surface 116 extending from another adjacent root surface 110 to the gear top land 112 thereof. Each gear tooth 106 of second gear 104 includes a first gear tooth surface 118 extending from one adjacent root surface 110 to the gear top land 112 thereof, and a second gear tooth surface 120 extending from another adjacent root surface 110 to the gear top land 112 thereof.

First gear tooth surface 114 of first gear 102 includes polycrystalline diamond surfaces 122 thereon. While shown as including three discrete polycrystalline diamond surfaces 122 on each first gear tooth surface 114, the present disclosure is not limited to including this arrangement, and may include more or less than three discrete polycrystalline diamond surfaces. In some embodiments, the entirety of first gear tooth surface 114 is polycrystalline diamond. In other embodiments, less than an entirety of first gear tooth surface 114 is polycrystalline diamond.

First gear 102 and second gear 104 are meshed such that polycrystalline diamond surfaces 122 of first gear 102 engage with first gear tooth surface 118 of second gear 104. Second gear tooth surface 118 includes a diamond reactive material. For example, second gear tooth surface 118 may be a steel surface.

In some embodiments, both of first gear and second gear are or include a diamond reactive material, with the provision that at least one of the first and second gears has polycrystalline diamond elements coupled therewith to provide power transmission surfaces thereon. While polycrystalline diamond surfaces 122 are shown only on one of the gear tooth surfaces of meshed gears 100 (i.e., on first gear tooth surface 114), the present disclosure is not limited to such an arrangement. For example, in some embodiments, second gear tooth surface 116 of first gear 102 may also include polycrystalline diamond surfaces thereon for engagement with second gear tooth surface 120 of second gear 104 that includes diamond solvent-catalyst. In other embodiments, second gear tooth surface 120 may include polycrystalline diamond surfaces for engagement with second gear tooth surface 116 of first gear 102. For example, in one embodiment both of surfaces 114 and 116 are or include polycrystalline diamond surfaces, while both of surfaces 118 and 120 are or include diamond solvent-catalyst, such that, regardless of whether the meshed gears 100 rotate clockwise or counterclockwise, the polycrystalline diamond surfaces are engaging with the diamond solvent-catalyst surfaces. In another embodiment, surfaces 114 and 120 are or include polycrystalline diamond surfaces, while surfaces 116 and 118 are or include diamond solvent-catalyst, such that, regardless of whether the meshed gears 100 rotate clockwise or counterclockwise, the polycrystalline diamond surfaces are engaging with the diamond solvent-catalyst surfaces.

First gear 102 is coupled with gear axle 124, and second gear 104 is coupled with gear axle 126. In one exemplary operation, rotation of gear axle 124 causes first gear 102 to rotate, rotation of first gear 102 causes second gear 104 to rotate, and rotation of second gear 104 causes gear axle 126 to rotate. First gear 102 and second gear 104 may be coupled with a first component at a drive end thereof and with a second component at a driven end thereof. Some exemplary components that may be coupled with the first and second gears 102,104 at the drive end include, but are not limited to, an electric motor, an internal combustion engine, a gas turbine engine, a wind turbine, a water turbine, a steam turbine, a hydraulic motor, and a drilling motor turbine. The component at the drive end rotates the first gear. For example, the component at the drive end may be coupled with gear axle 124, and may drive rotation of gear axle 124, which drives rotation of first gear 102, which drives rotation of second gear 104, which drives rotation of gear axle 126. At the driven end, gear axle 126 may be coupled with a component that is driven by first and second gears 102,104. Some exemplary driven end components include, but are not limited to, a pump, generator, driveline, machine tool spindle or chuck, wench, drill bit, power take off unit, propeller shaft, axle shaft, or other mechanical equipment that performs work. One skilled in the art would understand that numerous and various components may be driven by the gear assemblies disclosed herein.

During rotation of first gear 102, gear teeth 106 of first gear 102 engage between gear teeth 106 of second gear 104, such that first gear teeth surfaces 114 with polycrystalline diamond surfaces 122 engage (e.g., in sliding and/or rolling contact) with first gear teeth surfaces 118 of second gear 104. As such, during rotation of meshed gears 100, the polycrystalline diamond surfaces 122 engage, in sliding and/or rolling contact, with the diamond reactive material of first gear teeth surfaces 118. The power transmissions surfaces disclosed herein are not limited to being in sliding or rolling contact, and may be movingly engaged in other manners where the engagement surface and opposing engagement surface are in contact and apply pressure to one another.

Spur Gears

Figure 2A:
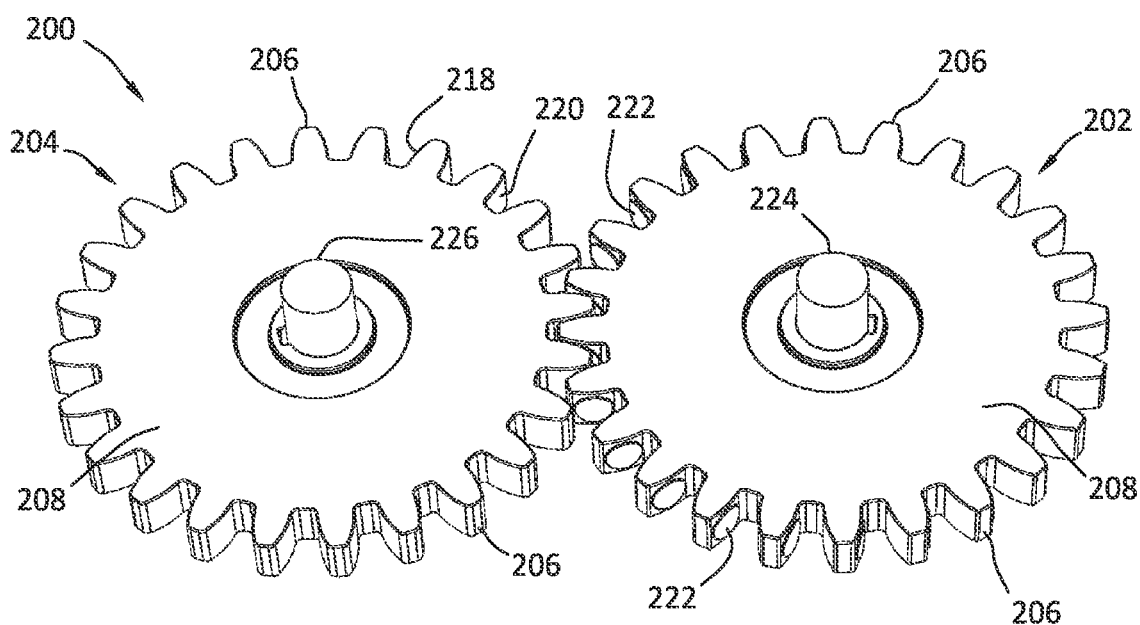
FIG. 2A depicts meshed, spur gears with one of the spur gears having polycrystalline diamond power transmission surfaces thereon.
Figure 2B:
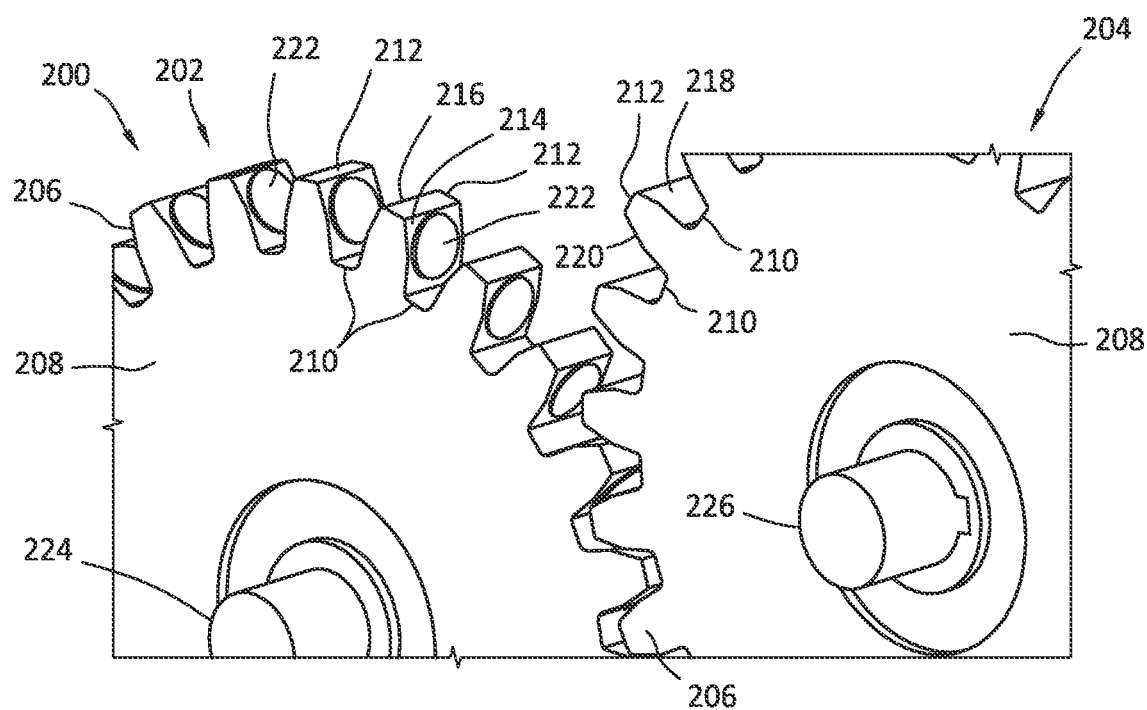
FIG. 2B depicts a detail view of the meshed, spur gears of FIG. 2A.

In one exemplary embodiment, the power transmission systems disclosed herein include meshed spur gears that include power transmission surfaces. With reference to FIGS. 2A and 2B, meshed spur gears 200 include first gear 202 and second gear 204, each of which is a spur gear. First gear 202 and second gear 204 are meshed together such that, in operation, mechanical power is transferred from one of first gear 202 and second gear 204 to the other of first gear 202 and second gear 204. Each of first gear 202 and second gear 204 includes a plurality of teeth 206 protruding from a gear body 208. As shown in FIG. 2B, each gear tooth 206 extends from gear body 208 between two adjacent root surfaces 210, and includes a gear top land 212. Each gear tooth 206 of first gear 202 includes a first gear tooth surface 214 extending from one adjacent root surface 210 to the gear top land 212 thereof, and a second gear tooth surface 216 extending from another adjacent root surface 210 to the gear top land 212 thereof. Each gear tooth 206 of second gear 204 includes a first gear tooth surface 218 extending from one adjacent root surface 210 to the gear top land 212 thereof, and a second gear tooth surface 220 extending from another adjacent root surface 210 to the gear top land 212 thereof.

First gear tooth surface 214 of first gear 202 includes polycrystalline diamond surfaces 222 thereon. While shown as including one discrete polycrystalline diamond surface 222 on each first gear tooth surface 214, the present disclosure is not limited to including this arrangement, and may include more than one discrete polycrystalline diamond surfaces. In some embodiments, the entirety of first gear tooth surface 214 is polycrystalline diamond. In other embodiments, less than an entirety of first gear tooth surface 214 is polycrystalline diamond.

First gear 202 and second gear 204 are meshed such that first gear tooth surface 214 of first gear 202 engages with first gear tooth surface 218 of second gear 204. Second gear tooth surface 218 includes diamond reactive material.

While polycrystalline diamond surfaces 222 are shown only on one of the gear tooth surfaces of meshed gears 200 (i.e., on first gear tooth surface 214), the present disclosure is not limited to such an arrangement. For example, in some embodiments, second gear tooth surface 216 of first gear 202 may also include polycrystalline diamond surfaces thereon for engagement with second gear tooth surface 220 of second gear 204 that includes diamond reactive material. In other embodiments, second gear tooth surface 220 may include polycrystalline diamond surfaces for engagement with second gear tooth surface 216 of first gear 202. For example, in one embodiment both of surfaces 214 and 216 are or include polycrystalline diamond surfaces, while both of surfaces 218 and 220 are or include diamond solvent-catalyst, such that, regardless of whether the meshed gears 200 rotate clockwise or counterclockwise, the polycrystalline diamond surfaces are engaging with the diamond solvent-catalyst surfaces. In another embodiment, surfaces 214 and 220 are or include polycrystalline diamond surfaces, while surfaces 216 and 218 are or include diamond solvent-catalyst, such that, regardless of whether the meshed gears 200 rotate clockwise or counterclockwise, the polycrystalline diamond surfaces are engaging with the diamond solvent-catalyst surfaces.

First gear 202 is coupled with gear axle 224, and second gear 204 is coupled with gear axle 226. In one exemplary operation, rotation of gear axle 224 causes first gear 202 to rotate, rotation of first gear 202 causes second gear 204 to rotate, and rotation of second gear 204 causes gear axle 226 to rotate. During rotation of first gear 202, gear teeth 206 of first gear 202 engage between gear teeth 206 of second gear 204, such that first gear teeth surfaces 214 with polycrystalline diamond surfaces 222 engage (e.g., in sliding and/or rolling contact) with first gear teeth surfaces 218 of second gear 204. As such, during rotation of meshed gears 200, the polycrystalline diamond surfaces 222 engage, in sliding and/or rolling contact, with the diamond solvent-catalyst of first gear teeth surfaces 218.

Worm Drive

In one exemplary embodiment, the power transmission systems disclosed herein include a worm drive, including a worm meshed with a worm gear, with the worm and worm gear including power transmission surfaces. With reference to FIGS. 3A-3C, worm drive 300 includes worm 301 and worm gear 303. Worm gear 303 may be the same or substantially similar to a spur gear. Worm 301 may be similar to a screw. Worm 301 is meshed with worm gear 303 such that, in operation, mechanical power is transferred from one of worm 301 and worm gear 303 to the other of worm 301 and worm gear 303. Worm 301 includes gear tooth 307 that extends about a full rotation of worm 301. Gear tooth 307 is similar to screw threading, extending helically about axle 326 of worm 301 from position 311a to position 311b. Gear tooth 307 extends from root surface 309, and includes gear top land 313. Gear tooth 307 includes first gear tooth surface 318 and second gear surface 320. Worm gear 303 includes a plurality of teeth 306 protruding from a gear body 308. As shown in FIG. 3B, each gear tooth 306 extends from gear body 308 between two adjacent root surfaces 310, and includes a gear top land 312. Each gear tooth 306 of worm gear 303 includes a first gear tooth surface 314 extending from one adjacent root surface 310 to the gear top land 312 thereof, and a second gear tooth surface 316 extending from another adjacent root surface 310 to the gear top land 312 thereof.

First gear tooth surface 314 of worm gear 303 includes polycrystalline diamond surfaces 322 thereon. While shown as including two discrete polycrystalline diamond surfaces 322 on each first gear tooth surface 314, the present disclosure is not limited to including this arrangement, and may include more or less than two discrete polycrystalline diamond surfaces. In some embodiments, the entirety of first gear tooth surface 314 is polycrystalline diamond. In other embodiments, less than an entirety of first gear tooth surface 314 is polycrystalline diamond.

Worm 301 and worm gear 303 are meshed such that first gear tooth surface 314 of worm gear 303 engages with first gear tooth surface 318 of worm 301. Second gear tooth surface 318 includes diamond reactive material (e.g., steel).

While polycrystalline diamond surfaces 322 are shown only on one of the gear tooth surfaces of meshed gears 300, the present disclosure is not limited to such an arrangement. For example, in some embodiments, second gear tooth surface 316 of worm gear 303 may also include polycrystalline diamond surfaces thereon for engagement with second gear tooth surface 320 of worm 301 that includes diamond solvent-catalyst. In other embodiments, second gear tooth surface 320 may include polycrystalline diamond surfaces for engagement with second gear tooth surface 316 of worm wheel 303. In such embodiments, regardless of whether the worm drive 300 rotates clockwise or counter-clockwise, the polycrystalline diamond surfaces are engaging with the diamond reactive material surfaces.

Worm gear 303 is coupled with gear axle 324, and worm 301 is coupled with gear axle 326. In one exemplary operation, rotation of gear axle 326 causes worm 301 to rotate, rotation of worm 301 causes worm gear 303 to rotate, and rotation of worm gear 303 causes gear axle 324 to rotate. During rotation of meshed gears 300, gear teeth 306 of worm gear 303 engage between surfaces 318 and 320 of gear tooth 307 of worm 301, such that first gear teeth surfaces 314 with polycrystalline diamond surfaces 322 engage (e.g., in sliding and/or rolling contact) with first gear teeth surface 318 of worm 301. As such, during rotation of meshed gears 300, the polycrystalline diamond surfaces 322 engage, in sliding and/or rolling contact, with the diamond solvent-catalyst of first gear teeth surfaces 318.

While the gears shown and described in FIGS. 1A-3C include particular embodiments of helical gears, spur gears, and worm drives, the present disclosure is not limited to these particular embodiments, and the disclosed power transmission surfaces with polycrystalline diamond may be incorporated into other gears. For example, and without limitation, the power transmission surfaces with polycrystalline diamond may be incorporated into spur gears, helical gears, skew gears, double helical gears, bevel gears, spiral bevel gears, hypoid gears, crown gears, worm drives, non-circular gears, rack and pinion gears, epicyclic gears, sun and planet gears, harmonic gears, cage gears, and cycloidal gears. Also, while shown herein as gears having cut teeth, the power transmission surfaces with polycrystalline diamond may be incorporated into cogwheels having inserted teeth. Further, while the gears shown herein are external gears with teeth on the outer surface, the power transmission surfaces with polycrystalline diamond may be incorporated into internal gears with teeth on the inner surface.

Mechanical Couplings

Some embodiments of the present disclosure include power transmission systems that include mechanical couplings, including flexible mechanical couplings. Some exemplary mechanical couplings include, but are not limited to, jaw couplings, claw couplings, and knuckle joints. In some embodiments, the mechanical couplings disclosed herein include universal joints, which are sometimes referred to as universal couplings, U-joints, Cardan joints, Spicer joints, Hardy Spicer joints, and Hooke's joints. Universal joints are joints used for connecting rigid rods together that have axes that are at least sometimes inclined and/or offset relative to one another. Some exemplary assemblies that include flexible mechanical couplings are constant velocity drivelines, propeller (prop) shafts, universal joint shafts, and double Cardan shafts.

Figure 4A:
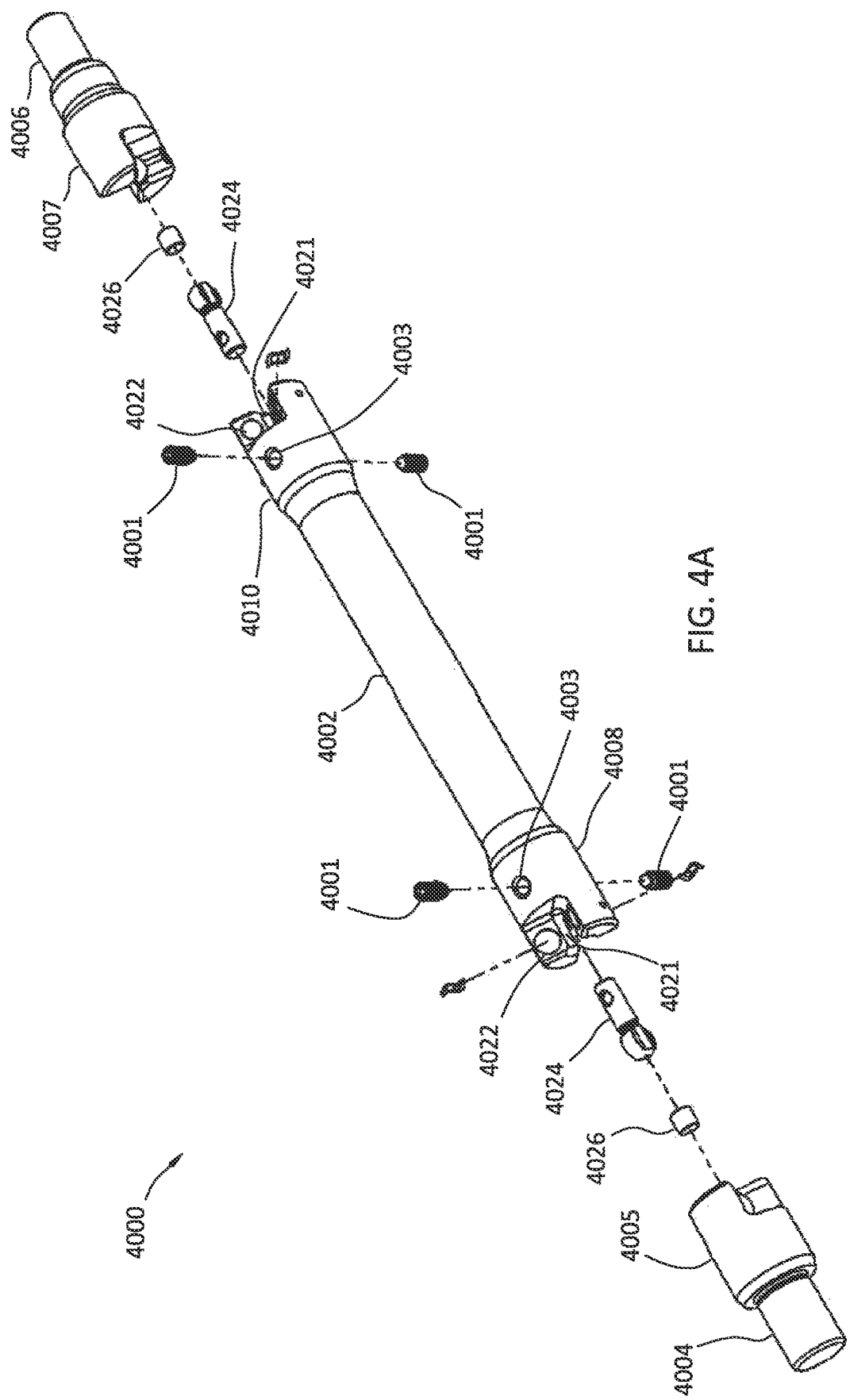
FIG. 4A is an exploded view of a portion of a driveline having an elongated universal joint with polycrystalline diamond power transmission surfaces thereon.
Figure 4D:
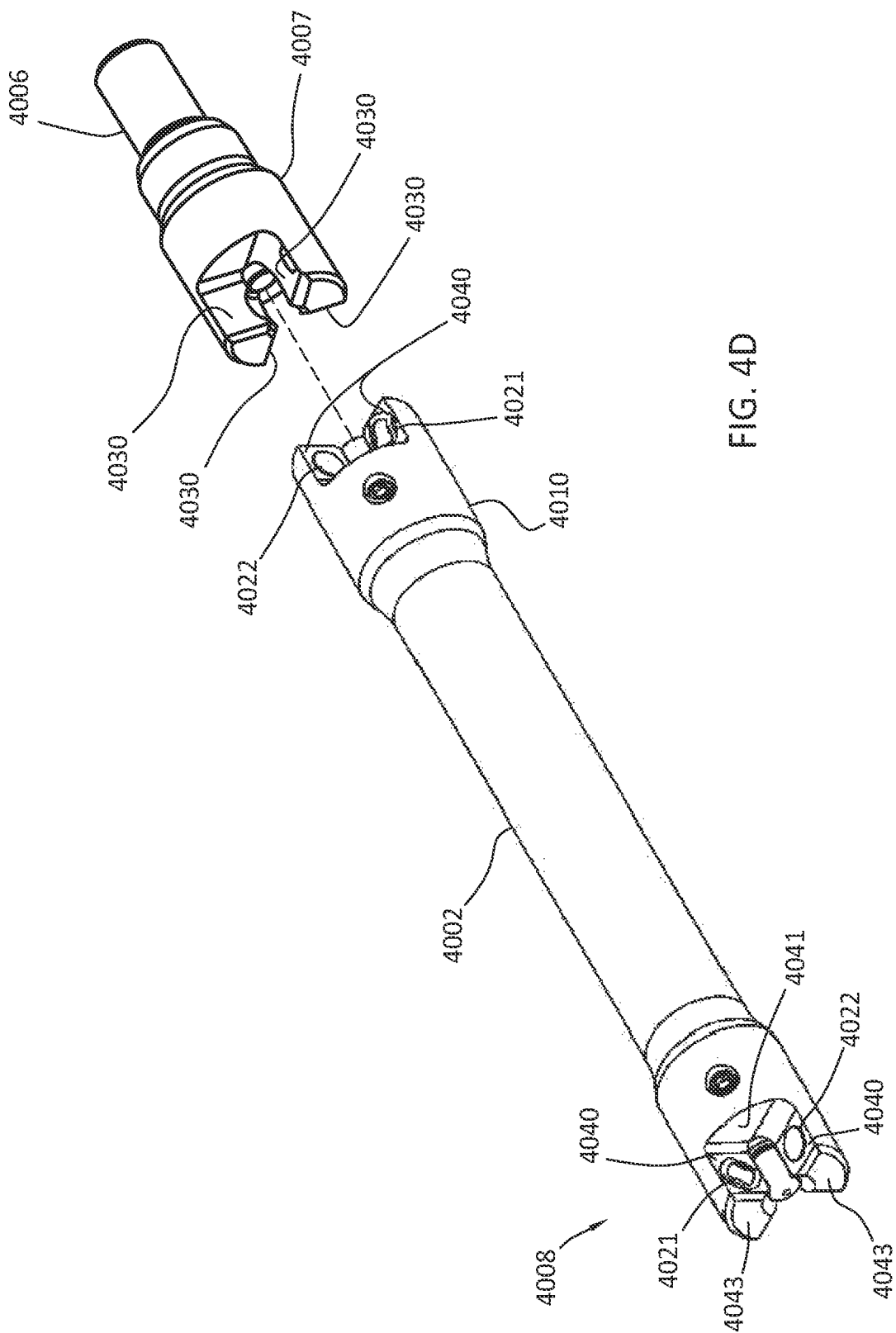
FIG. 4D is a disassembled view of portions of the driveline of FIG. 4A.

In some embodiments, the power transmission system disclosed herein includes an elongated universal joint for use in driveline applications, such as for use in drilling motors. With reference to FIGS. 4A-4D, a portion of an assembly having an elongated universal joint for use in driveline applications is depicted. Assembly 4000 includes shaft 4002. Shaft 4002 includes a hinge on each end thereof, including hinge 4008 and hinge 4010. As shown in FIG. 4B, hinge 4008 may be coupled with hinge 4005, which is coupled or integral with shaft 4004. Also, hinge 4010 may be coupled with hinge 4007, which is coupled or integral with shaft 4006. Also shown in the exploded view of FIG. 4A are set screws 4001, threaded holes 4003, locking pin 4024, and cups 4026. Locking pins 4024 have a ball end for mechanically coupling hinges 4008 and 4010 together and coupling hinges 4005 and 4007 together, and for providing a spherical bearing surface along with locating a pivot point for the hinges to rotate about. When assembled, the locking pins 4024 are turned 90 degrees to mechanically couple the respective hinges together. Set screws 4001 are then tightened to fix the position of the locking pins 4024 to prevent the two mating hinges from separating during operation. Cups 4026 have spherical cups machined therein and function as locaters for pivot points and as spherical bearing surfaces. Hinges 4008 and 4010 couple with hinges 4005 and 4007, respectively, via meshing the teeth 4009 thereof together. In at least some respects, hinges 4008, 4010, 4005, and 4007 are or are similar to gears, and function the same as or similar to gears in that the "teeth" of hinges mesh together for the transfer mechanical energy therebetween. The coupling of hinges 4008, 4010, 4005, and 4007 is the same as or similar to Hirth couplings or Curvic couplings.

Shaft 4004 may be coupled with or a portion of, for example, a motor that drives shaft 4004. When hinge 4005 is coupled with hinge 4008, rotation of shaft 4004 causes shaft 4002 to rotate. When hinge 4010 is coupled with hinge 4007, rotation of shaft 4002 causes shaft 4006 to rotate. Shaft 4006 may be coupled with or a portion of a component that is driven by assembly, such as a drill bit.

Each tooth of hinges 4008 and 4010 has tooth surfaces 4040 extending between root surface 4041 and top landing 4043. At least one tooth surface 4040 of each of hinges 4008 and 4010 has a polycrystalline diamond 4022 thereon. One of two adjacent teeth 4009 of hinges 4008 and 4010 has a polycrystalline diamond 4022 thereon and the other has a spring 4021 (here shown as a wave spring) thereon, providing compliance to assembly 4000 and reducing impact due to backlash as during transient events, such as at startup or shut-down. While not shown, the opposite side of hinges 4008 and 4010 may have the same arrangement. The tooth surfaces 4030 of hinges 4005 and 4007 include diamond reactive material. For example, in some embodiments, tooth surfaces 4030 of hinges 4005 and 4007 are steel. While springs 4021 are shown, the mechanical couplings disclosed herein are not limited to includes springs.

As shown in FIG. 4C, when hinges 4005 and 4008 are engaged, the teeth of hinge 4008 are positioned between adjacent teeth of hinge 4005, and the teeth of hinge 4005 are positioned between adjacent teeth of hinge 4008. The polycrystalline diamonds 4022 are engaged with the tooth surfaces 4030, such that the engagement between the hinges 4005 and 4008 is at least partially interfaced via engagement between the surfaces of the polycrystalline diamonds 4022 tooth surfaces 4030. The engagement between hinges 4007 and 4010 is the same or substantially similar to that of hinges 4005 and 4008. In operation, assembly 4000 exploits excess backlash and looseness of fit between the hinges in order to accommodate various ranges of motions. For example, assembly 4000 exploits excess backlash and looseness of fit between the hinges in order to accommodate axial, radial, and/or angular misalignment within assembly 4000.

In some embodiments, the polycrystalline diamond surfaces and the diamond reactive material surfaces are arranged within assembly 4000 such that, regardless of the direction of rotation (clockwise or counterclockwise) of the assembly 4000, polycrystalline diamond surfaces are engaged with diamond reactive material surfaces in the assembly 4000 during rotation. For example, rather than springs 4021 on the surfaces opposite the polycrystalline diamonds 4022, the springs 4021 of hinges 4008 and 4010 could be replaced with polycrystalline diamonds and all of the tooth surfaces 4030 of hinges 4005 and 4007 could be diamond reactive material surfaces such that, regardless of the direction or rotation of assembly 4000, polycrystalline diamond surfaces are engaged with diamond reactive material surfaces in the assembly 4000. Alternatively, rather than springs 4021 on the surfaces opposite the polycrystalline diamonds 4022, the springs 4021 of hinges 4008 and 4010 could be replaced with diamond reactive material surfaces, the tooth surfaces 4030 of hinges 4005 and 4007 that engage with the diamond reactive material surfaces of hinges 4008 and 4010 could be polycrystalline diamonds, and the tooth surfaces 4030 of hinges 4005 and 4007 that engage with the polycrystalline diamonds 4022 of hinges 4008 and 4010 could be diamond reactive material surfaces such that, regardless of the direction or rotation of assembly 4000, polycrystalline diamond surfaces are engaging with diamond reactive material surfaces in the assembly 4000.

As can be seen in FIG. 4C, the opposing engagement surface is crowned, with tooth surface 4030 positioned outward relative to curved surfaces 4032 and 4037. Tooth surface 4030 has a width 4031 that is narrower than a width 4020 of the engagement surface of polycrystalline diamond 4022. This projection of tooth surface 4030 from tooth 4009 and relative narrowness of tooth surface 4030 relative to polycrystalline diamond 4022 reduces or eliminates the occurrence of edge contact between the polycrystalline diamond 4022 and tooth surface 4030, such that the polycrystalline diamond 4022 does not gouge the diamond reactive material of tooth surface 4030 during operation thereof.

Figure 5A:
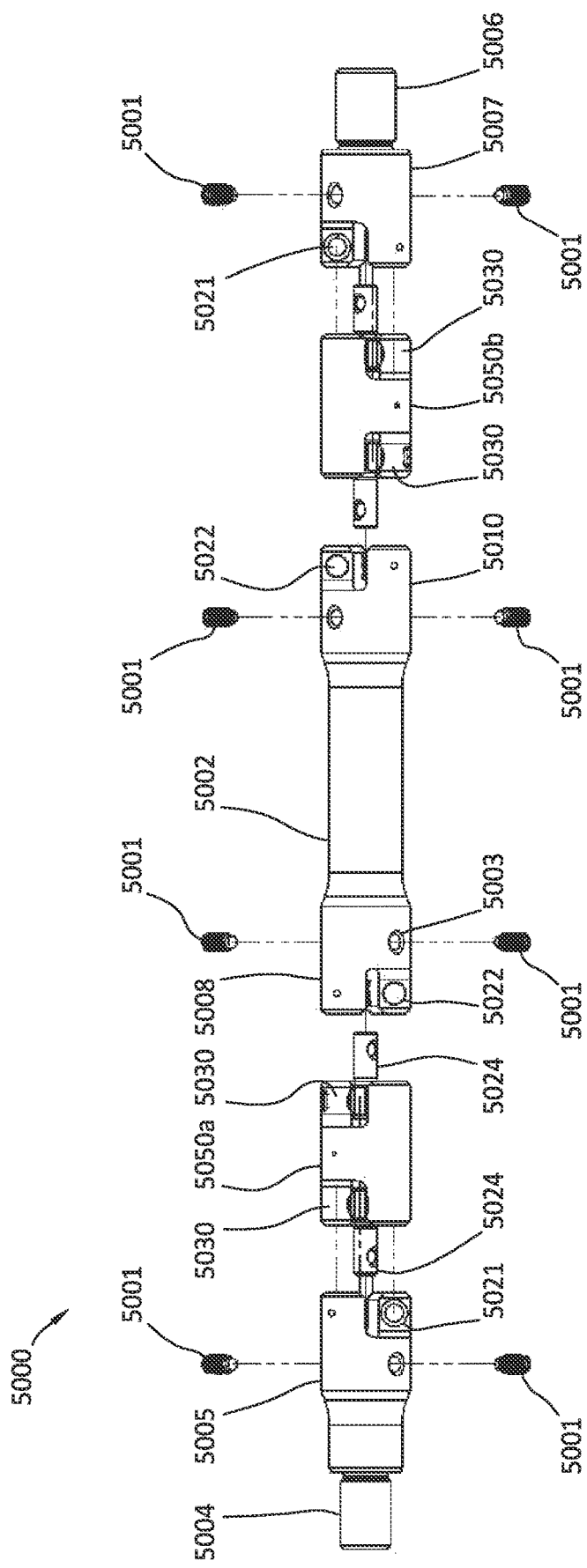
FIG. 5A is an exploded view of a portion of a driveline having a double Cardan universal joint with polycrystalline diamond power transmission surfaces thereon.

In some embodiments, the power transmission system disclosed herein includes a double Cardan universal joint for use in driveline applications, such as for use in drilling motors. Assemblies with double Cardan universal joints include two sets of universal joints. In operation, when the sets of universal joints are aligned, assemblies with double Cardan universal joints can provide constant velocity. With reference to FIGS. 5A-5F, a portion of an assembly having a double Cardan universal joint for use in driveline applications is depicted. Assembly 5000 is substantially similar to assembly 4000, with the addition of shaft couplers 5050a and 5050b. Assembly 5000 includes shaft 5002. Shaft 5002 includes a hinge on each end thereof, including hinge 5008 and hinge 5010. Assembly 5000 includes shaft couplers 5050a and 5050b. Assembly includes hinge 5005 coupled or integral with shaft 5004, and hinge 5007 coupled or integral with shaft 5006. Hinge 5008 may be coupled with one end of shaft coupler 5050a, and hinge 5005 may be coupled with the opposite end of shaft coupler 5050a. Hinge 5010 may be coupled with one end of shaft coupler 5050b, and hinge 5007 may be coupled with the opposite end of shaft coupler 5050b. Also shown in the exploded view of FIG. 5A are set screws 5001, threaded holes 5003, and locking pins 5024.

Figure 5B:
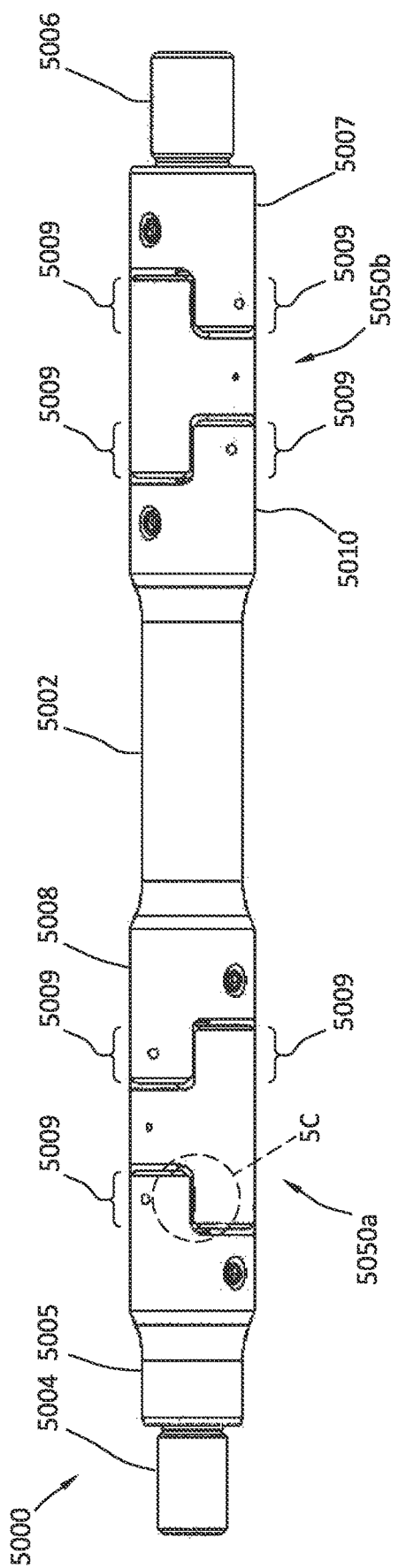
FIG. 5B is an assembled view of the portion of the driveline of FIG. 5A.
Figure 5C:
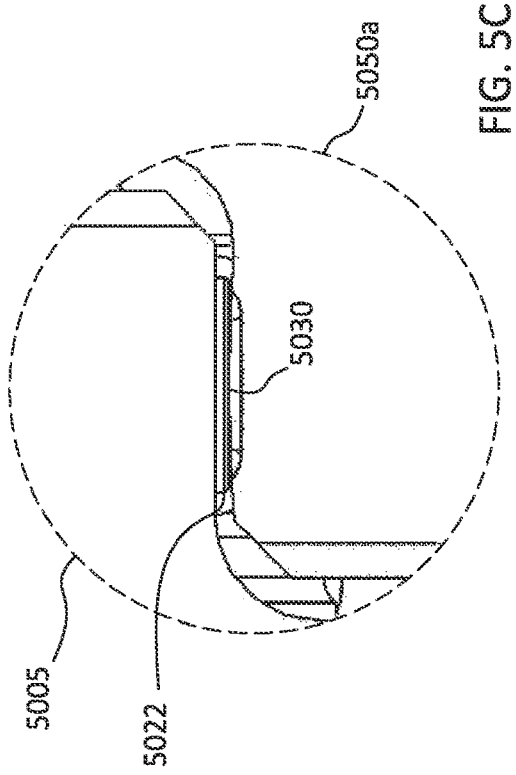
FIG. 5C is a detail view of a portion of FIG. 5B.
Figures 5E, 5F:
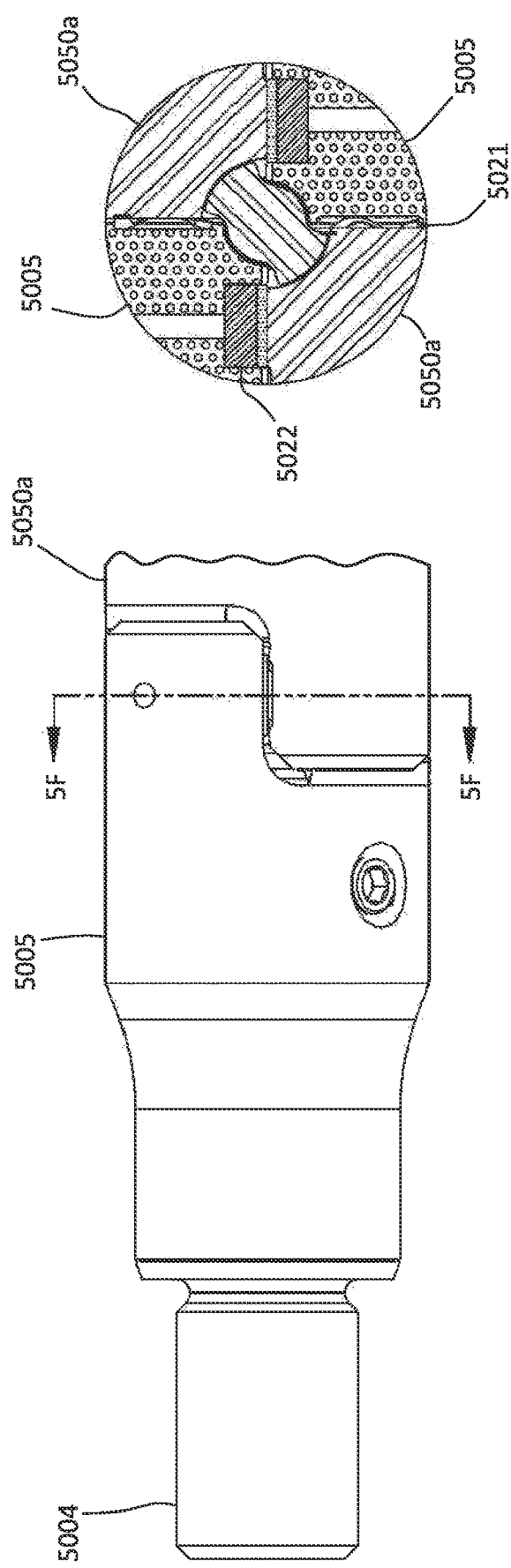
FIG. 5E is a view of the connection between two components of the double Cardan universal joint of FIG. 5A.
FIG. 5F is a cross-sectional view of a FIG. 5E.

As shown in FIG. 5B, each of hinges 5008, 5010, 5005, and 5007, as well as shaft couplers 5050a and 5050b include teeth 5009. Shaft coupler 5050a couples with hinges 5008 and 5005 via meshing of the teeth 5009 thereof, and shaft coupler 5050b couples with hinges 5010 and 5007 via meshing of the teeth 5009 thereof. In at least some respects, hinges 5008, 5010, 5005, and 5007 and shaft couplers 5050a and 5050b are or are similar to gears, and function the same as or similar to gears in that the teeth thereof mesh together for the transfer mechanical energy therebetween. The coupling of hinges 5008, 5010, 5005, and 5007 is the same as or similar to Hirth couplings or Curvic couplings.

Shaft 5004 may be coupled with or a portion of, for example, a motor that drives shaft 5004. When hinge 5005 is coupled with hinge 5008 via shaft coupler 5050a, rotation of shaft 5004 causes shaft coupler 5050a to rotate, and rotation of shaft coupler 5050a causes shaft 5002 to rotate. When hinge 5010 is coupled with hinge 5007 via shaft coupler 5050b, rotation of shaft 5002 causes shaft coupler 5050b to rotate, and rotation of shaft coupler 5050b causes shaft 5006 to rotate. Shaft 5006 may be coupled with or a portion of a component that is driven by assembly, such as a drill bit.

With reference to FIGS. 5D, 5G, and 5H, each tooth 5009 of hinges 5005, 5007, 5008, and 5010 has tooth surfaces 5040 extending between a root surface 5041 and top landing 5043. At least one tooth surface 5040 of each of hinges 5008, 5010, 5005, and 5007 has a polycrystalline diamond 5022 thereon. As shown in FIGS. 5D, 5G, and 5H, each tooth 5009 has a polycrystalline diamond 5022 on one tooth surface 5040 thereof and a spring 5021 on the other tooth surface 5040 thereof. The tooth surfaces 5030 of shaft couplers 5050a and 5050b include diamond solvent-catalyst. For example, in some embodiments, tooth surfaces 5030 are steel. As such, when assembled, the polycrystalline diamonds 5022 are engaged with the tooth surfaces 5030, such that the engagement between the hinges 5005, 5007, 5008, and 5010 with shaft couplers 5050a and 5050b is at least partially interfaced via engagement between the surfaces of the polycrystalline diamonds 5022 tooth surfaces 5030.

In some embodiments, the polycrystalline diamond surfaces and the diamond reactive material surface are arranged within assembly 5000 such that, regardless of the direction of rotation (clockwise or counterclockwise) of the assembly 5000, polycrystalline diamond surfaces are engaged with diamond solvent-catalyst surfaces in the assembly 5000 during rotation. For example, rather than springs 5021 on the surfaces opposite the polycrystalline diamonds 5022, the springs 5021 of any one or more of hinges 5005, 5007, 5008 and 5010 could be replaced with polycrystalline diamonds and all of the tooth surfaces 5030 of couplers 5050a and 5050b could be diamond reactive material surfaces such that, regardless of the direction or rotation of assembly 5000, polycrystalline diamond surfaces are engaged with diamond reactive material surfaces in the assembly 5000. Alternatively, the springs 5021 of any one or more of hinges 5005, 5007, 5008 and 5010 could be replaced with diamond reactive material surfaces, one or more of the tooth surfaces 5030 that engage with the diamond reactive material surfaces of hinges 5005, 5007, 5008 and 5010 could be polycrystalline diamonds, and the tooth surfaces 5030 that engage with the polycrystalline diamonds 5022 could be diamond reactive material surfaces such that, regardless of the direction or rotation of assembly 5000, polycrystalline diamond surfaces are engaging with diamond reactive material surfaces in the assembly 5000.

Figure 6:
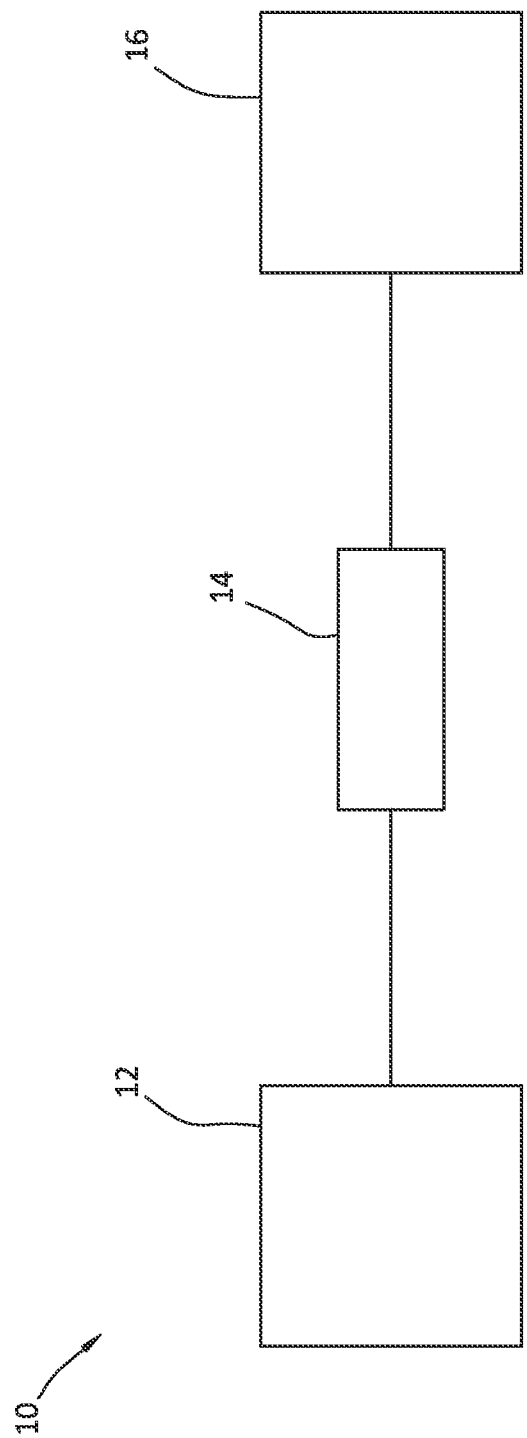
FIG. 6 is a schematic of a power transmission system driven by a first component and driving a second component.

FIG. 6 depicts an exemplary system 10. System 10 includes motor 12. Motor 12 is coupled with power transmission system 14. Power transmission system 14 is coupled with component 16. Power transmission system 14 may be any of the power transmission systems disclosed herein that include polycrystalline diamond power transmission surfaces engaged with diamond reactive material power transmission surfaces. Power transmission system 14 may be or include a set of gears and/or a universal joint. For example, power transmission system 14 may be or include any of the gears shown in FIGS. 1A-3C or any of the universal joints shown in FIGS. 4A-5F. In operation, motor 12 drives power transmission system 14, such as via rotating a drive shaft coupled with or integral with the power transmission system 14, and power transmission system 14 drives the component 16, such as via rotating a shaft coupled with or integral with the component 16. The component may be any of numerous components, as described elsewhere herein. Some examples of components include, but are not limited to, drill bits and propellers.

Polycrystalline Diamond Bearing Elements

In some embodiments, the polycrystalline diamond surfaces disclosed herein are surfaces of polycrystalline diamond elements that are coupled with or otherwise incorporated into or with the power transmission system components (e.g., gears or universal joints) disclosed herein. For example, the polycrystalline diamond elements may be coupled with the power transmission surfaces of the power transmission systems. In some embodiments, the polycrystalline diamond elements are positioned to be flush with existing power transmission surfaces. In other embodiments, the polycrystalline diamond elements are positioned to be raised above existing power transmission surfaces. Such polycrystalline diamond elements may be or include thermally stable polycrystalline diamond, either supported or unsupported by tungsten carbide, or polycrystalline diamond compact (PDC). In certain applications, the polycrystalline diamond elements disclosed herein have increased cobalt content transitions layers between the outer polycrystalline diamond surface and a supporting tungsten carbide slug. The polycrystalline diamond elements may be supported by tungsten carbide, or may be unsupported, "standalone" polycrystalline diamond elements that are mounted directly to the power transmission system component. The polycrystalline diamond elements may by non-leached, leached, leached and backfilled, thermally stable, coated via chemical vapor deposition (CVD), or processed in various ways as known in the art.

In some embodiments, the engagement surfaces of the polycrystalline diamond elements disclosed herein are planar, convex, or concave. In some embodiments, wherein the engagement surfaces of the polycrystalline diamond elements are concave, the concave engagement surfaces are oriented with the axis of the concavity in line with the circumferential rotation of the respective power transmission system component. In some embodiments, the polycrystalline diamond elements have beveled edges. The polycrystalline diamond elements may have diameters as small as 3 mm (about ⅛") or as large as 75 mm (about 3"), depending on the application. Typically, the polycrystalline diamond elements have diameters between 8 mm (about ⁵⁄₁₆") and 25 mm (about 1").

Although the polycrystalline diamond elements are most commonly available in cylindrical shapes, it is understood that the technology of the application may be practiced with polycrystalline diamond elements that are square, rectangular, oval, any of the shapes described herein with reference to the Figures, or any other appropriate shape known in the art. In some applications, one or more convex, contoured polycrystalline diamond elements are mounted on the power transmission system component (e.g., gear or mechanical coupling) in sliding and/or rolling contact with an opposing surface of another power transmission system component (e.g., another gear or portion of the universal joint).

The polycrystalline diamond elements may be arranged in any pattern, layout, spacing or staggering within the power transmission system to provide the desired interfacing of contact, without concern for the need for overlapping contact with polycrystalline diamond elements engagement surfaces on the opposing power transmission system component. The polycrystalline diamond elements disclosed herein are, in some embodiments, not shaped to conform to the opposing engagement surface. The polycrystalline diamond elements disclosed herein are, in other embodiments, shaped to conform to the opposing engagement surface.

One performance criterion is that the polycrystalline diamond element is configured and positioned in such a way as to preclude any edge contact with the opposing engagement surface or component. In some aspects, the polycrystalline diamond elements are subjected to edge radius treatment.

Opposing Engagement Surface

In some aspects, the opposing engaging surface (e.g., of the opposing gear or portion of the universal joint), that is, the surface that is engaged with the polycrystalline diamond surface, has carbon applied thereto. In some such aspects, the carbon is applied to the opposing bearing surface prior to engagement with the engagement surface. For example, the opposing bearing surface may be saturated with carbon. Without being bound by theory, it is believed that such application of carbon reduces the ability of the diamond solvent-catalyst in the opposing engagement surface to attract carbon through graphitization of the surface of the polycrystalline diamond element. That is, the carbon that is applied to the opposing surface functions as a sacrificial layer of carbon. The opposing surfaces disclosed herein may be surfaces that contain at least 2 wt. % of diamond solvent-catalyst.

With reference to FIGS. 1A-5F, some exemplary opposing engagement surfaces include first gear tooth surfaces 118, 218, and 318, and tooth surfaces 4030 and 5030. In some embodiments, the opposing engagement surfaces are or include a metal or metal alloy that contains at least 2 wt. % of a diamond solvent-catalyst based on a total weight of the metal or metal alloy. The diamond solvent-catalyst may be iron, cobalt, nickel, ruthenium, rhodium, palladium, chromium, manganese, copper, titanium, tantalum, or alloys thereof. In some embodiments, the opposing engagement surfaces are or include a metal or metal alloy that contains from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond solvent-catalyst based on a total weight of the metal or metal alloy (e.g., from 2 to 100 wt. %, of iron, cobalt, nickel, ruthenium, rhodium, palladium, chromium, manganese, copper, titanium, tantalum, or alloys thereof).

Driveline with Double Conical Joints

Certain embodiments of the present disclosure include methods and systems that include use of and/or incorporation of a driveline that includes one or more double conical joints that provide flexibility to the driveline (also referred to herein as a "double conical driveline"). The double conical driveline may be arranged as a flexible mechanical coupling between two moving parts, such as between an electric motor and a positive displacement pump (PDP).

With reference to FIGS. 7A and 7B, double conical driveline 700 is depicted. Double conical driveline 700 includes drive shaft 702. Drive shaft 702 includes a first oscillatory coupling 704a at a first end thereof for coupling with a prime mover (e.g., motor), and a second oscillatory coupling 704b at a second end thereof for coupling with a machine (e.g., PDP).

First oscillatory coupling 704a includes bearing coupler 706a coupled with shaft 702. Bearing coupler 706a may be pinned to, welded to, or otherwise fixedly attached to shaft 702. In some embodiments, bearing coupler 706a is integral with shaft 702, such that shaft 702 and bearing coupler 706a are a single-piece structure. First oscillatory coupling 704a includes double conical joint 708a. Double conical joint 708a includes first conical joint 712a coupled with or integral with second conical joint 712b. Each conical joint 712a and 712b has a conical surface thereon for coupling with and engagement with other parts of double conical driveline 700. First conical joint 712a is coupled with bearing coupler 706a via spindle 714a. Spindle 714a is secured with bearing coupler 706a and first conical joint 712a via a crown nut 716a. Bearing coupler 706a and first conical joint 712a are each rotatable about spindle 714a. First oscillatory coupling 704a includes bearing coupler 706b. Second conical joint 712b is coupled with bearing coupler 706b via spindle 714b. Bearing coupler 706b and second conical joint 712b are each rotatable about spindle 714b. Spindle 714b is secured with bearing coupler 706b and second conical joint 712b via crown nut 716b.

Second oscillatory coupling 704b is identical or substantially identical to first oscillatory coupling 704a and includes bearing coupler 706c coupled with shaft 702; double conical joint 708b having conical joint 712c coupled with or integral with conical joint 712d. Conical joint 712c is coupled with bearing coupler 706c via spindle 714c, and conical joint 712d is coupled with bearing coupler 706d via spindle 714d. Spindles 714c and 714d are secured via crown nuts 716c and 716d, respectively. Crown nuts 716a-716d are each secured via a cotter pin (not shown). The double conical driveline disclosed herein is not limited to the structure shown in FIGS. 7A and 7B. For example, the double conical joints may be coupled with the bearing coupler using structures other than a spindle, crown nut, and cotter pin, while still attaining the double conical joint arrangement disclosed herein.

FIG. 8A depicts a portion of a double conical driveline, assembly 899a, in accordance with embodiments of the present disclosure. Assembly 899a includes bearing coupler 806. Spindle 814 is coupled with or integral with bearing coupler 806. The position of spindle 814 relative to bearing coupler 806 is fixed, such that spindle 814 does not move relative to bearing coupler 806. Spindle 814 includes a plurality of holes 818 about and through the outer surface thereof. Holes 818 are arranged and configured to receive cotter pins for securing a crown nut to spindle 814.

FIG. 8B depicts another portion of a double conical driveline, assembly 899b. Assembly 899b includes the bearing coupler 806 and spindle 814 of FIG. 8A, but with double conical joint 808 coupled with spindle 814. Each conical joint 812a and 812b includes a conical surface 820, on both sides thereof, surrounding an opening 824. Each opening 824 defines a conical axis 826a (horizontally on the page) and 826b (extending out of and going into the page). The conical axes 826a and 826b of double conical joint 808 are at an angle greater than 0° relative to one another. As shown in FIG. 8B, the conical axes 826a and 826b are at an angle of 90°. The conical axes 826a and 826b are not parallel and do not intersect. In other embodiments, the conical axes do intersect. A plurality of polycrystalline diamond compacts 822 are positioned and coupled on each conical surface 820. The plurality of polycrystalline diamond compacts 822 are positioned to provide the bearing surface(s) of double conical joint 808.

FIG. 8C depicts another portion of a double conical driveline, assembly 899c. Assembly 899c includes the bearing coupler 806, spindle 814, and double conical joint 808 as shown in FIG. 8B, but with crown nut 816 coupled therewith. Crown nut 816 includes spaces 828 that are positioned such that at least some of the spaces 828 of crown nut 816 align with at least some of the holes 818 of spindle 814, allowing for the coupling of a cotter pin therethrough to secure crown nut 816 onto spindle 814.

FIG. 8D depicts another portion of a double conical driveline, assembly 899d. Assembly 899d includes the bearing coupler 806, spindle 814, double conical joint 808, and crown nut 816 of FIG. 8C, but with the body of double conical joint 808 at least partially transparent to show the plurality of polycrystalline diamond compacts 822 therein. The surfaces of the polycrystalline diamond compacts 822 are power transmission surfaces of the double conical joint 808. FIG. 8E shows the opposite side of assembly 899d, as shown in FIG. 8D, showing that both sides of each conical joint 812a and 812b include a conical bearing surface 820.

With reference to FIGS. 9A and 9B, the engagement between the polycrystalline diamond compacts 922 on conical surface 920 and the crown nut 916 and spindle 914 is shown, particularly in the cross-sectional view of FIG. 9B. Crown nut 916 is coupled with spindle via a pin (not shown) engaged through one of holes 918. Double conical joint 908 includes conical joints 912a and 912b. With conical joint 912a coupled about spindle 914 and crown nut 916 secured to spindle 914, diamond bearing surfaces 930 of each polycrystalline diamond compact 922 are engaged with and in sliding contact with an opposing bearing surface. The opposing bearing surfaces include opposing bearing surfaces 932 of crown nut 916 and opposing bearing surfaces 934 of spindle 914. Each opposing bearing surface 932 and 934 is a metallic surface. Each opposing bearing surface 932 and 934 is a diamond reactive material, such as steel. Bearing coupler 906 moves relative to double conical joint 908 by rotating about conical axis 926a. During rotation of bearing coupler 906 about conical axis 926a, diamond bearing surfaces 930 are in sliding contact with opposing bearing surfaces 932 and 934.

Figure 10:
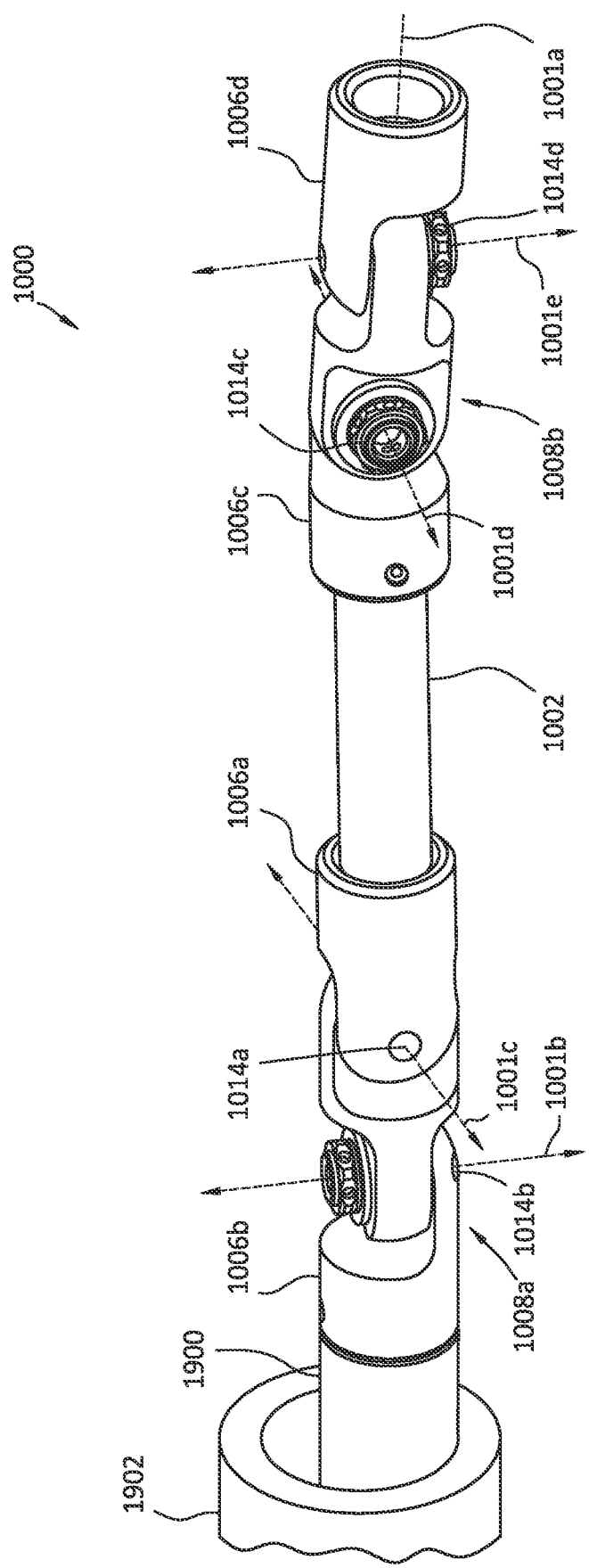
FIG. 10 depicts a driveline including double conical joints with polycrystalline diamond power transmission surfaces, with the driveline coupled with a rotor positioned in a stator.

With reference to FIG. 10, double conical driveline 1000 is coupled with rotor 1900. More particularly, rotor 1900 is coupled with bearing coupler 1006b of double conical driveline 1000. Rotor 1900 is rotatably engaged within stator 1902. Rotation of rotor 1900 within stator 1902 imparts rotational force to bearing coupler 1006b, which imparts rotational force to double conical joint 1008a, which imparts rotational force to bearing coupler 1006a, which imparts rotational force to shaft 1002, which imparts rotational force to bearing coupler 1006c, which imparts rotational force to double conical joint 1008b, which imparts rotational force to bearing coupler 1006d. Bearing coupler 1006d may be coupled with a machine or tool, such as a positive displacement pump to drive operation of the pump. Thus, rotation of bearing coupler 1006d may drive the machine or tool.

Double conical driveline 1000 has multiple degrees of freedom of motion in various directions, as provided by double conical joints 1008a and 1008b. The motions (degrees of freedom) available to double conical driveline 1000 during operation include: (1) rotation of the entire driveline 1000 about axis 1001a; (2) rotation of double conical joint 1008a about spindle 1014b at axis 1001b; (3) rotation of double conical joint 1008a about spindle 1014a at axis 1001c; (4) rotation of double conical joint 1008b about spindle 1014c at axis 1001d; and (5) rotation of double conical joint 1008b about spindle 1014d at axis 1001c. Each of these motions (1)-(5) is independent of the others, such that rotation about one of the spindles does not affect the availability of rotation about any of the other of the spindles and does not affect the ability of the entire double conical driveline 1000 to rotate about axis 1001a. These multiple degrees of freedom provided by the motions (1)-(5) provide the ability to double conical driveline 1000 to drive machinery under various states of "misalignment" of the double conical driveline 1000. As used herein a "state of misalignment," in reference to the double conical driveline 1000, refers to a physical arrangement, positioning, and/or state of the double conical driveline 1000 wherein an imaginary line passing through the center of each portion of the double conical driveline 1000 does not define a straight line. The degrees of freedom of motion that the double conical driveline 1000 has allows the double conical driveline 1000 to react to various forces imparted onto the double conical driveline 1000 during operation, and allows the double conical driveline 1000 to oscillate during rotation in response to such forces. As the conical bearings bear load in all directions, and as each movable joint of the double conical driveline 1000 is provided by a conical bearing, the double conical driveline 1000 is capable of bearing load in all directions. During operation of the double conical driveline, forces are transmitted from torque in both forward and reverse directions. That is, the double conical driveline 1000 is capable of transmitting torque both when the double conical driveline 1000 is rotating clockwise about axis 1001a and when the double conical driveline 1000 is rotating counterclockwise about axis 1001a. Because the bearings of the double conical driveline 1000 are double conical bearings, the double conical driveline 1000 can bear axial loads both in tension and in compression.

In some embodiments, the double conical driveline and the conical bearings thereof are not sealed. In other embodiments, the double conical driveline and the conical bearings thereof are sealed. In some embodiments, the double conical driveline and the conical bearings thereof are not lubricated. In other embodiments, the double conical driveline and the conical bearings thereof are lubricated.

With reference to FIG. 11, double conical driveline 1100 is coupled with prime mover 1170 at one end and is coupled with machine or tool 1160 at the other end. Prime mover 1170 may be a motor or engine, such as an eclectic motor or diesel engine. Machine or tool 1160 may be, for example and without limitation, farm equipment, mining equipment, downhole drilling and/or production equipment, assembly line equipment, steel mill equipment, automobile components, or marine (e.g., boat) components. Some exemplary applications of the double conical driveline 1100 disclosed herein are as a driveline between an electric motor and a pump, such as PDP or progressive cavity pump; as a driveshaft of an automobile, such as a heavy duty truck; as a steering column of an automobile; as a driveshaft of a boat propeller; as a driveline coupled with a wind turbine; as a driveline between an electric motor and an air compressor; a driveline for a downhole motor; and as a power take off (PTO) driveline on a tractor, such as to drive ploughing, harvesting, or other farming equipment. The driveline disclosed herein is not limited to these particular applications and may be used in various other applications.

While double conical driveline disclosed herein is shown as including a plurality of discrete polycrystalline diamond bearing elements in the form of PDCs, the double conical driveline is not limited to this arrangement, and the bearing surfaces of the double conical driveline may include continuous polycrystalline diamond bearing surfaces. Furthermore, while the double conical driveline disclosed herein is shown as having conical bearing surfaces, the drivelines disclosed herein are not limited to this arrangement. For example, the drivelines may include spherical bearing surfaces, a combination of radial and thrust bearing surfaces, or another bearing surface arrangement that is capable of bearing combined axial and radial loads. Also, while the drivelines disclosed herein are shown, in some embodiments, as having double conical joints at each end of the shaft, in other embodiments the driveline has a double conical joint only on one end thereof, such as for driving equipment.

Applications

In certain embodiments, the power transmission systems disclosed herein are suitable for deployment and use in harsh environments (e.g., downhole). In some such aspects, the power transmission systems are less susceptible to fracture than power transmission systems that include a polycrystalline diamond engagement surface engaged with another polycrystalline diamond engagement surface. In certain aspects, such harsh environment suitable power transmission systems provide enhanced service value in comparison with power transmission systems that include a polycrystalline diamond engagement surface engaged with another polycrystalline diamond engagement surface.

As would be understood by one skilled in the art, various forms of gear failure can occur including, but not limited to, bending fatigue, contact fatigue, wear, scuffing, overload, and cracking. Without being bound by theory, it is believed that gears incorporating the power transmission surfaces disclosed herein (i.e., a polycrystalline diamond power transmission surface engaged with a diamond reactive material power transmission surface) will exhibit a reduced occurrence of such gear failures. It is further believed that a reduction of universal joint failure will also occur for universal joints that incorporate the power transmission surfaces disclosed herein.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A driveline with double conical joints, the driveline comprising:
   a drive shaft having a first end and a second end;
   a first bearing coupler at the first end of the drive shaft, the first bearing coupler having a metal bearing surface, the metal bearing surface including a metal that contains at least 2 wt. % diamond solvent-catalyst based on a total weight of the metal; and
   a first double conical joint comprising a polycrystalline diamond element thereon, the polycrystalline diamond element having a polycrystalline diamond bearing surface;
   wherein the first double conical joint is rotatably coupled with the first bearing coupler such that the polycrystalline diamond bearing surface of the first double conical joint is in sliding contact with the metal bearing surface of the first bearing coupler.

2. The driveline of claim 1, wherein the first double conical joint comprises a first conical joint including a conical bearing surface having the polycrystalline diamond element with the polycrystalline diamond bearing surface thereon, and a second conical joint coupled with the first conical joint, the second conical joint including a conical bearing surface having a polycrystalline diamond element with a polycrystalline diamond bearing surface;
   wherein the first conical joint is rotatably coupled with the first bearing coupler such that the polycrystalline diamond bearing surface of the first conical joint is in sliding contact with the metal bearing surface of the first bearing coupler.

3. The driveline of claim 2, further comprising:
   a second bearing coupler, the second bearing coupler having a metal bearing surface comprising a metal that contains at least 2 weight percent of diamond solvent-catalyst based on a total weight of the metal;
   wherein the second conical joint is rotatably coupled with the second bearing coupler such that the polycrystalline diamond bearing surface of the second conical joint is in sliding contact with the metal bearing surface of the second bearing coupler.

4. The driveline of claim 3, further comprising:
   a third bearing coupler coupled with the second end of the drive shaft, the third bearing coupler having a metal bearing surface, the metal bearing surface comprising a metal that contains at least 2 weight percent of diamond solvent-catalyst based on a total weight of the metal;
   a second double conical joint coupled with the third bearing coupler, the second double conical joint comprising a third conical joint including a conical bearing surface having a polycrystalline diamond element with a polycrystalline diamond bearing surface, and a fourth conical joint coupled with the third conical joint, the fourth conical joint including a conical bearing surface having a polycrystalline diamond element with a polycrystalline diamond bearing surface;
   wherein the third conical joint is rotatably coupled with the second bearing coupler such that the polycrystalline diamond bearing surfaces of the third conical joint is in sliding contact with the metal bearing surface of the second bearing coupler.

5. The driveline of claim 4, further comprising:
   a fourth bearing coupler, the fourth bearing coupler having a metal bearing surface comprising a metal that contains at least 2 weight percent of diamond solvent-catalyst based on a total weight of the metal;
   wherein the fourth conical joint is rotatably coupled with the fourth bearing coupler such that the polycrystalline diamond bearing surface of the fourth conical joint is in sliding contact with the metal bearing surface of the fourth bearing coupler.

6. The driveline of claim 5, wherein the first conical joint is rotatable relative to the first bearing coupler about a first axis, wherein the second conical joint is rotatable relative to the second bearing coupler about a second axis, and wherein the first axis is at an angle of from greater than 0° to 90° relative to the second axis; and
   wherein the third conical joint is rotatable relative to the second bearing coupler about a third axis, wherein the fourth conical joint is rotatable relative to the fourth bearing coupler about a fourth axis, and wherein the third axis is at an angle of from greater than 0° to 90° relative to the fourth axis.

7. The driveline of claim 3, wherein the first conical joint is rotatable relative to the first bearing coupler about a first axis, wherein the second conical joint is rotatable relative to the second bearing coupler about a second axis, and wherein the first axis is at an angle of from greater than 0° to 90° relative to the second axis.

8. The driveline of claim 1, wherein the diamond solvent-catalyst is selected from the group consisting of: iron, cobalt, nickel, ruthenium, rhodium, palladium, chromium, manganese, copper, titanium, tantalum, and combinations thereof.

9. The driveline of claim 1, wherein the metal is softer than a superhard material.

10. The driveline of claim 1, wherein the metal contains at least 55 weight percent of the diamond solvent-catalyst based on the total weight of the metal.

11. The driveline of claim 1, wherein the first bearing coupler is integral with the drive shaft.

12. The driveline of claim 1, wherein the first bearing coupler is coupled with the drive shaft.

13. The driveline of claim 1, wherein the polycrystalline diamond element comprises a polycrystalline diamond compact.

14. A method of driving a machine, the method comprising:
providing a driveline, the driveline comprising a first double conical joint on a first end thereof and a second double conical joint on a second end thereof, each double conical joint having polycrystalline diamond elements with polycrystalline diamond bearing surfaces;
coupling a first bearing coupler between the first double conical joint and a prime mover such that a metal bearing surface of the first bearing coupler is in sliding contact with a polycrystalline diamond bearing surface of the first double conical joint, wherein the metal bearing surface of the first bearing coupler comprises a metal that contains at least 2 weight percent of diamond solvent-catalyst based on a total weight of the metal;
coupling a second bearing coupler between the second double conical joint and a machine such that a metal bearing surface of the second bearing coupler is in sliding contact with a polycrystalline diamond bearing surface of the second double conical joint, wherein the metal bearing surface of the second bearing coupler comprises a metal that contains at least 2 weight percent of diamond solvent-catalyst based on a total weight of the metal;
driving rotation of the driveline with the prime mover; and
driving the machine with the rotating driveline.

15. The method of claim 14, wherein, during rotation of the driveline, the first and second conical joints oscillate through rotational positions about axes.

16. The method of claim 14, wherein, during rotation of the driveline, the metal bearing surface of the first bearing coupler slides along the polycrystalline diamond bearing surface of the first double conical joint and the metal bearing surface of the second bearing coupler slides along the polycrystalline diamond bearing surface of the second double conical joint.

17. A system, the system comprising:
a driveline, the driveline comprising a first double conical joint on a first end thereof and a second double conical joint on a second end thereof, wherein the first double conical joints comprises a polycrystalline diamond element having a polycrystalline diamond bearing surface, wherein the second double conical joints comprises a polycrystalline diamond element having a polycrystalline diamond bearing surface;
a prime mover;
a first bearing coupler positioned between the first double conical joint and the prime mover such that a metal bearing surface of the first bearing coupler is in sliding contact with the polycrystalline diamond bearing surface of the first double conical joint, wherein the metal bearing surface of the first bearing coupler comprises a metal that contains at least 2 weight percent of diamond solvent-catalyst based on a total weight of the metal;
a machine;
a second bearing coupler positioned between the second double conical joint and the machine such that a metal bearing surface of the second bearing coupler is in sliding contact with the polycrystalline diamond bearing surface of the second double conical joint, wherein the metal bearing surface of the second bearing coupler comprises a metal that contains at least 2 weight percent of diamond solvent-catalyst based on a total weight of the metal;
wherein the prime mover is configured to drive rotation of the driveline, and wherein the driveline is configured to drive the machine.

18. The system of claim 17, wherein the prime mover is a motor and the machine is a positive displacement pump.

19. The system of claim 18, wherein the motor comprises a rotor movably positioned within a stator.

20. The system of claim 17, wherein the machine is farm equipment, mining equipment, downhole drilling or production equipment, assembly line equipment, steel mill equipment, an automobile component, or a boat component.

21. The system of claim 17, wherein the driveline is a driveshaft of an automobile, a steering column of an automobile, a driveshaft of a boat propeller, a driveline coupled with a wind turbine, a driveline coupled with an air compressor, or a power take off driveline on a tractor.

22. A driveline with double conical joints, the driveline comprising:
a drive shaft having a first end and a second end;
a first bearing coupler at the first end of the drive shaft, the first bearing coupler having a metal bearing surface, the metal bearing surface including a metal that contains at least 2 wt. % of iron, cobalt, nickel, ruthenium, rhodium, palladium, chromium, manganese, copper, titanium, tantalum, or combinations thereof based on a total weight of the metal; and
a first double conical joint comprising a polycrystalline diamond element thereon, the polycrystalline diamond element having a polycrystalline diamond bearing surface;
wherein the first double conical joint is rotatably coupled with the first bearing coupler such that the polycrystalline diamond bearing surface of the first double conical joint is in sliding contact with the metal bearing surface of the first bearing coupler.

23. A driveline with double conical joints, the driveline comprising:
a drive shaft having a first end and a second end;
a first bearing coupler at the first end of the drive shaft, the first bearing coupler having a first metal bearing surface, the first metal bearing surface including a metal that contains at least 2 wt. % diamond solvent-catalyst based on a total weight of the metal;
a first double conical joint comprising a first polycrystalline diamond element thereon, the first polycrystalline diamond element having a first polycrystalline diamond bearing surface, wherein the first double conical joint is rotatably coupled with the first bearing coupler such that the first polycrystalline diamond bearing surface of the first double conical joint is in sliding contact with the first metal bearing surface of the first bearing coupler;
a second bearing coupler at the second end of the drive shaft, the second bearing coupler having a second metal bearing surface, the second metal bearing surface including a metal that contains at least 2 wt. % diamond solvent-catalyst based on a total weight of the metal;

a second double conical joint comprising a second polycrystalline diamond element thereon, the second polycrystalline diamond element having a second polycrystalline diamond bearing surface, wherein the second double conical joint is rotatably coupled with the second bearing coupler such that the second polycrystalline diamond bearing surface of the second double conical joint is in sliding contact with the second metal bearing surface of the second bearing coupler; and wherein the metal of each of the first and second metal bearing surfaces is softer than a superhard material.

* * * * *